(12) United States Patent
Rao et al.

(10) Patent No.: US 10,712,425 B1
(45) Date of Patent: Jul. 14, 2020

(54) COGNITIVE DENOISING OF NONSTATIONARY SIGNALS USING TIME VARYING RESERVOIR COMPUTER

(71) Applicant: HRL Laboratories, LLC, Malibu, CA (US)

(72) Inventors: Shankar R. Rao, Agoura Hills, CA (US); Peter Petre, Oak Park, CA (US); Bryan H. Fong, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/112,071

(22) Filed: Aug. 24, 2018

Related U.S. Application Data

(63) Continuation-in-part of application No. 15/452,412, filed on Mar. 7, 2017, now Pat. No. 10,153,806, which is a continuation-in-part of application No. 15/073,626, filed on Mar. 17, 2016, now Pat. No. 9,749,007, application No. 16/112,071, which is a continuation-in-part of application No. 15/631,307, filed on Jun. 23, 2017, now Pat. No. 10,162,378, which is a continuation-in-part of application No. 15/073,626, filed on Mar. 17, 2016, now Pat. No. 9,749,007, said application No. 15/631,307 is a continuation-in-part of application No. 15/452,155, filed on Mar. 7, 2017, now Pat. No. 10,484,043, (Continued)

(51) Int. Cl.
| | |
|---|---|
| *H04B 1/719* | (2011.01) |
| *G01S 7/28* | (2006.01) |
| *G01S 13/88* | (2006.01) |
| *G06N 3/04* | (2006.01) |
| *G06N 3/08* | (2006.01) |

(52) U.S. Cl.
CPC .......... *G01S 7/2813* (2013.01); *G01S 13/88* (2013.01); *G06N 3/049* (2013.01); *G06N 3/08* (2013.01)

(58) Field of Classification Search
CPC ........ H03H 21/002; H03H 2021/0034; H04B 1/719; H04B 1/71632
USPC ................... 375/130; 342/377; 704/207, 203
See application file for complete search history.

(56) References Cited

U.S. PATENT DOCUMENTS

| | | |
|---|---|---|
| 5,694,474 A | 12/1997 | Ngo |
| 6,691,073 B1 | 2/2004 | Erten |

(Continued)

OTHER PUBLICATIONS

H. Jaeger, et al. "Harnessing nonlinearity: Predicting chaotic systems and saving energy in wireless communications," Science, vol. 304, No. 5667, pp. 78-80, 2004 (Year: 2004).*

(Continued)

*Primary Examiner* — Fitwi Y Hailegiorgis
(74) *Attorney, Agent, or Firm* — Tope-McKay & Associates

(57) ABSTRACT

Described is a system for signal denoising using a cognitive signal processor having a time-varying reservoir. The system receives a noisy input signal of a time-series of data points from a mixture of waveform signals. The noisy input signal is linearly mapped into the time-varying reservoir. A high-dimensional state-space representation of the mixture of waveform signals is generated by combining the noisy input signal with a plurality of reservoir states. The system then generates a denoised signal corresponding to the noisy input signal.

18 Claims, 19 Drawing Sheets
(11 of 19 Drawing Sheet(s) Filed in Color)

Related U.S. Application Data which is a continuation-in-part of application No. 15/073,626, filed on Mar. 17, 2016, now Pat. No. 9,749,007, said application No. 15/631,307 is a continuation-in-part of application No. 15/452,412, filed on Mar. 7, 2017, now Pat. No. 10,153,806, which is a continuation-in-part of application No. 15/073,626, filed on Mar. 17, 2016, now Pat. No. 9,749,007, application No. 16/112,071, which is a continuation-in-part of application No. 15/910,821, filed on Mar. 2, 2018, and a continuation-in-part of application No. 15/910,922, filed on Mar. 2, 2018, now Pat. No. 10,404,299, which is a continuation-in-part of application No. 15/452,412, filed on Mar. 7, 2017, now Pat. No. 10,153,806, said application No. 15/910,922 is a continuation-in-part of application No. 15/631,307, filed on Jun. 23, 2017, now Pat. No. 10,162,378, said application No. 15/910,922 is a continuation-in-part of application No. 15/452,155, filed on Mar. 7, 2017, now Pat. No. 10,484,043, said application No. 15/910,922 is a continuation-in-part of application No. 15/817,906, filed on Nov. 20, 2017, now Pat. No. 10,128,820.

(60) Provisional application No. 62/304,623, filed on Mar. 7, 2016, provisional application No. 62/135,539, filed on Mar. 19, 2015, provisional application No. 62/379,634, filed on Aug. 25, 2016, provisional application No. 62/500,889, filed on May 3, 2017, provisional application No. 62/500,966, filed on May 3, 2017, provisional application No. 62/477,883, filed on Jan. 18, 2017, provisional application No. 62/574,001, filed on Oct. 18, 2017, provisional application No. 62/576,905, filed on Oct. 25, 2017.

(56) References Cited

U.S. PATENT DOCUMENTS

| | | | |
|---|---|---|---|
| 7,474,756 B2 | 1/2009 | Ricard et al. | |
| 8,031,117 B2* | 10/2011 | Goldberg | H04B 7/0854 342/377 |
| 9,042,496 B1 | 5/2015 | Su | |
| 2004/0054479 A1* | 3/2004 | Trickett | G01V 1/36 702/14 |
| 2005/0047611 A1 | 3/2005 | Mao | |
| 2005/0267377 A1 | 12/2005 | Marossero | |
| 2010/0158271 A1 | 6/2010 | Park et al. | |
| 2012/0207195 A1 | 8/2012 | Kawasaki | |
| 2012/0232418 A1* | 9/2012 | Kimura | A61B 5/02411 600/528 |
| 2013/0304395 A1* | 11/2013 | Naidu | G01N 27/333 702/25 |
| 2014/0114650 A1* | 4/2014 | Hershey | G10L 21/0232 704/203 |
| 2014/0327566 A1* | 11/2014 | Burgio | G01S 13/72 342/108 |
| 2016/0203827 A1* | 7/2016 | Leff | G06T 13/40 704/207 |

OTHER PUBLICATIONS

Notification of Transmittal of International Search Report and the Written Opinion of the International Searching Authority for PCT/US2017/062561; dated Feb. 6, 2018.
International Search Report of the International Searching Authority for PCT/US2017/062561; dated Feb. 6, 2018.
Written Opinion of the International Searching Authority for PCT/US2017/062561; dated Feb. 6, 2018.
E. Candès and T. Tao, "Near-Optimal Signal Recovery from Random Projections: Universal Encoding Strategies?", IEEE Transactions on Information Theory, vol. 52, No. 12, pp. 5406-5425, 2006.
H. Jaeger, et al. "Harnessing nonlinearity: Predicting chaotic systems and saving energy in wireless communications," Science, vol. 304, No. 5667, pp. 78-80, 2004.
R. Legenstein, et al. "Edge of Chaos and Prediction of Computational Performance for Neural Microcircuit Models," Neural Networks, 20(3), pp. 323-334, 2007.
W. Maass, "Liquid Computing", Proc. of the Conference CiE'07: Computability in Europe, Siena (Italy), CiE 2007, LNCS 4497, pp. 507-516, 2007.
S. Mann and S. Haykin, "The Chirplet transform: A generalization of Gabor's logon transform", Proc. Vision Interface 1991, pp. 205-212, 3-7, 1991.
A. Oppenheim and R. Schafer, "Chapter 7: Filter Design Techniques", in Discrete-Time Signal Processing, Second Edition, pp. 439-540, 1999.
F. Takens, "Detecting Strange Attractors in Turbulence," Dynamical Systems and Turbulence, Lecture Notes in Mathematics vol. 898, pp. 366-381, 1981.
R. Walden, "Analog-to-digital converter survey and analysis," IEEE J. Sel. Areas Commun., vol. 51, pp. 539-548, 1999.
H. Yap, et al., "A First Analysis of the Stability of Takens' Embedding," in Proc. of the IEEE Global Conference on Signal and Information Processing (GlobalSIP) symposium on Information Processing for Big Data, pp. 404-408, Dec. 2014.
D. Verstraeten, et al. "An experimental unification of reservoir computing methods", Neural Networks, vol. 20, No. 3, Apr. 2007, pp. 391-403.
Notice of Allowance for U.S. Appl. No. 15/452,412, dated Jul. 13, 2018.
Response to Office Action 3 for U.S. Appl. No. 15/452,412, dated Jun. 6, 2018.
Office Action 3 for U.S. Appl. No. 15/452,412, dated Mar. 7, 2018.
Response to Office Action 2 for U.S. Appl. No. 15/452,412, dated Feb. 13, 2018.
Office Action 2 for U.S. Appl. No. 15/452,412, dated Nov. 14, 2017.
Response to Office Action 1 for U.S. Appl. No. 15/452,412, dated Aug. 9, 2017.
Office Action 1 for U.S. Appl. No. 15/452,412, dated May 10, 2017.
S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.
A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.
A. Hyvarinen, "Complexity Pursuit: Separating Interesting Components from Time Series," Neural Computation, vol. 13, No. 4, pp. 883-898, Apr. 2001.
Igel, C. and Husken, M., "Improving the Rprop learning algorithm", in Proc. of the 2nd Int. Symposium on Neural Computation (NC'2000), pp. 115-121, ICSC Academic Press, 2000.
Notice of Allowance for U.S. Appl. No. 15/073,626, dated Apr. 25, 2017.
Office Action 1 for U.S. Appl. No. 15/073,626, dated Sep. 16, 2016.
Response to Office Action 1 for U.S. Appl. No. 15/073,626, dated Dec. 16, 2016.
Office Action 1 for U.S. Appl. No. 15/817,906, dated Feb. 23, 2018.
Response to Office Action 1 for U.S. Appl. No. 15/817,906, dated May 23, 2018.
Notice of Allowance for U.S. Appl. No. 15/817,906, dated Jul. 6, 2018.
Notice of Allowance for U.S. Appl. No. 15/631,307, dated Jul. 18, 2018.
Response to Office Action 2 for U.S. Appl. No. 15/631,307, dated Jun. 15, 2018.
Office Action 2 for U.S. Appl. No. 15/631,307, dated Apr. 19, 2018.
Response to Office Action 1 for U.S. Appl. No. 15/631,307, dated Jan. 4, 2018.

(56) References Cited

OTHER PUBLICATIONS

Office Action 1 for U.S. Appl. No. 15/631,307, dated Oct. 5, 2017.
Response to Office Action 1 for U.S. Appl. No. 16/108,041, dated Feb. 27, 2019.
Notice of Allowance for U.S. Appl. No. 16/108,041, dated Mar. 15, 2019.
Notice of Allowance for U.S. Appl. No. 15/452,155, dated Jun. 11, 2019.
Notification of International Preliminary Report on Patentability (Chapter I) for PCT/US2017/062561; dated Aug. 1, 2019.
International Preliminary Report on Patentability (Chapter I) for PCT/US2017/062561; dated Aug. 1, 2019.

\* cited by examiner

COGNITIVE DENOISING OF NONSTATIONARY SIGNALS USING TIME VARYING RESERVOIR COMPUTER

CROSS-REFERENCE TO RELATED APPLICATIONS

This is a Continuation-in-Part Application of U.S. Non-Provisional application Ser. No. 15/452,412, filed on Mar. 7, 2017, entitled, "Cognitive Architecture for Wideband, Low-Power, Real-Time Signal Denoising," which is a Non-Provisional Application of U.S. Provisional Patent Application No. 62/304,623, filed on Mar. 7, 2016, entitled, "Cognitive Architecture for Wideband, Low-Power, Real-Time Signal Denoising," the entirety of which are incorporated herein by reference. U.S. application Ser. No. 15/452,412 is also a a Continuation-in-Part Application of U.S. Pat. No. 9,749,007, filed on Aug. 29, 2017, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference.

This is also a Continuation-in-Part Application of U.S. Non-Provisional application Ser. No. 15/631,307, filed on Jun. 23, 2017, entitled, "A Neuromorphic Processor for Wideband Signal Analysis," which is a Non-Provisional Application of U.S. Provisional Application No. 62/379,634, filed in the United States on Aug. 25, 2016, entitled, "A Neuromorphic Processor for Wideband Signal Analysis," the entirety of which is incorporated herein by reference. U.S. application Ser. No. 15/631,307 is also a Continuation-in-Part application of U.S. application Ser. No. 15/073,626, filed in the United States on Mar. 17, 2016, entitled "Cognitive Blind Source Separator," which is a Non-Provisional Application of U.S. Provisional Application No. 62/135,539, filed on Mar. 19, 2015, entitled, "Cognitive Blind Source Separator," the entirety of which are incorporated herein by reference. U.S. application Ser. No. 15/631,307 is also a Continuation-in-Part application of U.S. application Ser. No. 15/452,155, filed in the United States on Mar. 7, 2017, entitled, "Adaptive Blind Source Separator for Ultra-Wide Bandwidth Signal Tracking," which is a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which are incorporated herein by reference. U.S. application Ser. No. 15/452,155 is a Continuation-in-Part application of U.S. application Ser. No. 15/073,626, filed in the United States on Mar. 17, 2016, entitled, "Cognitive Blind Source Separator," which is a Non-Provisional Application of U.S. Provisional Application No. 62/135,539, filed in the United States on Mar. 19, 2015, entitled, "Cognitive Blind Source Separator," the entirety of which are incorporated herein by reference. U.S. application Ser. No. 15/631,307 is also a Continuation-in-Part application of U.S. application Ser. No. 15/452,412, filed in the United States on Mar. 7, 2017, entitled, "Cognitive Architecture for Wideband, Low-Power, Real-Time Signal Denoising," which is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which are incorporated herein by reference. U.S. application Ser. No. 15/452,412 is a Continuation-in-Part application of U.S. Non-Provisional application Ser. No. 15/073,626, filed on Mar. 17, 2016, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference.

This is ALSO a Continuation-in-Part Application of U.S. Non-Provisional application Ser. No. 15/910,821, filed on Mar. 2, 2018, entitled, "Cognitive Signal Processor," which is a Non-Provisional Application of U.S. Provisional Patent Application No. 62/500,889, filed on May 3, 2017, entitled, "Hardware Design and Implementation of Cognitive Signal Processor," the entirety of which are incorporated herein by reference.

This is ALSO a Continuation-in-Part Application of U.S. Non-Provisional application Ser. No. 15/910,922, filed on Mar. 2, 2018, entitled, "System for Parallelized Cognitive Signal Denoising," which is a Non-Provisional Application of U.S. Provisional Patent Application No. 62/500,966, filed on May 3, 2017, entitled, "Parallelized Cognitive Signal Denoising Architecture," the entirety of which are incorporated herein by reference. U.S. application Ser. No. 15/910,922 is a Continuation-in-Part Application of U.S. Non-Provisional Application No. 15/452,412, filed in the United States on Mar. 7, 2017, entitled, "Cognitive Architecture for Wideband, Low-Power, Real-Time Signal Denoising," which is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which are incorporated herein by reference. U.S. application Ser. No. 15/910,922 is also a Continuation-in-Part Application of U.S. Non-Provisional application Ser. No. 15/631,307, filed on Jun. 23, 2017, entitled, "A Neuromorphic Processor for Wideband Signal Analysis," which is a Non-Provisional Application of U.S. Provisional Application No. 62/379,634, filed in the United States on Aug. 25, 2016, entitled, "A Neuromorphic Processor for Wideband Signal Analysis," the entirety of which is incorporated herein by reference. U.S. application Ser. No. 15/910,922 is also a Continuation-in-Part Application of U.S. application Ser. No. 15/452,155, filed in the United States on Mar. 7, 2017, entitled, "Adaptive Blind Source Separator for Ultra-Wide Bandwidth Signal Tracking," which is a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which are incorporated herein by reference. U.S. application Ser. No. 15/910,922 is also a Continuation-in-Part Application of U.S. application Ser. No. 15/817,906, filed on Nov. 20, 2017, entitled, "Cognitive Signal Processor for Simultaneous Denoising and Blind Source Separation," which is a Non-Provisional Application of U.S. Provisional Application No. 62/447,883, filed on Jan. 18, 2017, entitled, "A Cognitive Signal Processor for Simultaneous Denoising and Blind Source Separation," the entirety of which are incorporated herein by reference.

This is ALSO a Non-Provisional Application of U.S. Provisional Application No. 62/574,001, filed in the United States on Oct. 18, 2017, entitled, "Efficient Cognitive Signal Denoising with Sparse Output Layers," the entirety of which is hereby incorporated by reference.

This is ALSO a Non-Provisional patent application of U.S. Provisional Application No. 62/576,905, filed in the United States on Oct. 25, 2017, entitled, "Cognitive Denoising of Nonstationary Signals Using Time Varying Reservoir Computer," the entirety of which is hereby incorporated by reference.

BACKGROUND OF INVENTION

(1) Field of Invention

The present invention relates to a system for signal denoising and, more particularly, to a system for signal denoising with reduced computational and hardware complexity.

(2) Description of Related Art

State-of-the-art systems for detecting, localizing, and classifying source emitters from passive radio frequency (RF) antennas over an ultra-wide bandwidth (>30 Gigahertz (GHz)) require high rate analog-to-digital converters (ADC). Such high-rate ADCs are expensive and power hungry, and due to fundamental physical limits, such as the Walden curve (see Literature Reference No. 8 of the List of Incorporated Literature References), are not capable of achieving the sampling rate needed to capture the ultra-wide bandwidth. To mitigate this, state-of-the-art Electronic Support Measures (ESM) systems either use spectrum sweeping (which is too slow to handle agile emitters) or a suite of digital channelizers, which have large size, weight, and power requirements. In addition, the detection, localization, and classification algorithms that state-of-the-art ESM systems use are typically based on the fast Fourier transform, with high computational complexity and memory requirements that make it difficult to operate them in real-time over an ultra-wide bandwidth.

Conventional methods for denoising fall into two categories: filter-based methods and training-based methods. Filter-based methods use filtering to smooth out noise from a signal but are too simplistic to simultaneously maintain the low-frequency long-term trends of a signal while adapting to the high-frequency abrupt transitions. Training-based methods rely on a "dictionary" that models the signals of interest. Such a dictionary must be trained in an offline process, and requires training data that may not be available. Moreover, the dictionary often requires a large amount of memory and computation to be stored and leverage on the platform, making such approaches infeasible for ultra-low SWaP (size, weight, and power) systems.

Thus, a continuing need exists for a system for signal denoising with reduced computational and hardware complexity.

SUMMARY OF INVENTION

The present invention relates to a system for signal denoising and, more particularly, to a system for signal denoising with reduced computational and hardware complexity. The system comprises a cognitive signal processor having a time-varying reservoir and a non-transitory computer-readable medium having executable instructions encoded thereon such that when executed, the cognitive signal processor performs multiple operations. A noisy input signal comprising a time-series of data points from a mixture of waveform signals is received and linearly mapped into the time-varying reservoir. A high-dimensional state-space representation of the mixture of waveform signals is generated by combining the noisy input signal with a plurality of reservoir states. Delay-embedded states of the reservoir are generated from the plurality of reservoir states. A denoised signal corresponding to the noisy input signal is generated.

In another aspect, a real-time denoised time-varying spectrogram of the noisy input signal is generated.

In another aspect, the delay-embedded states are adapted for producing a predicted input signal a time-step into the future.

In another aspect, the system determines an error function between a predicted input signal and the noisy input signal. Output layer weights of the time-varying reservoir are adapted in an iterative process using the error function.

In another aspect, the error function is used to adapt the output layer weights via a gradient learning algorithm.

In another aspect, the time-varying reservoir is a recurrent neural network.

In another aspect, a state transition matrix of the time-varying reservoir comprises a block diagonal structure.

In another aspect, each delay embedded state has a distinct state transition matrix.

In another aspect, the noisy input signal is a nonstationary basis signal.

In another aspect, the denoised signal is used in an automotive radar system for detection of radar pulses.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
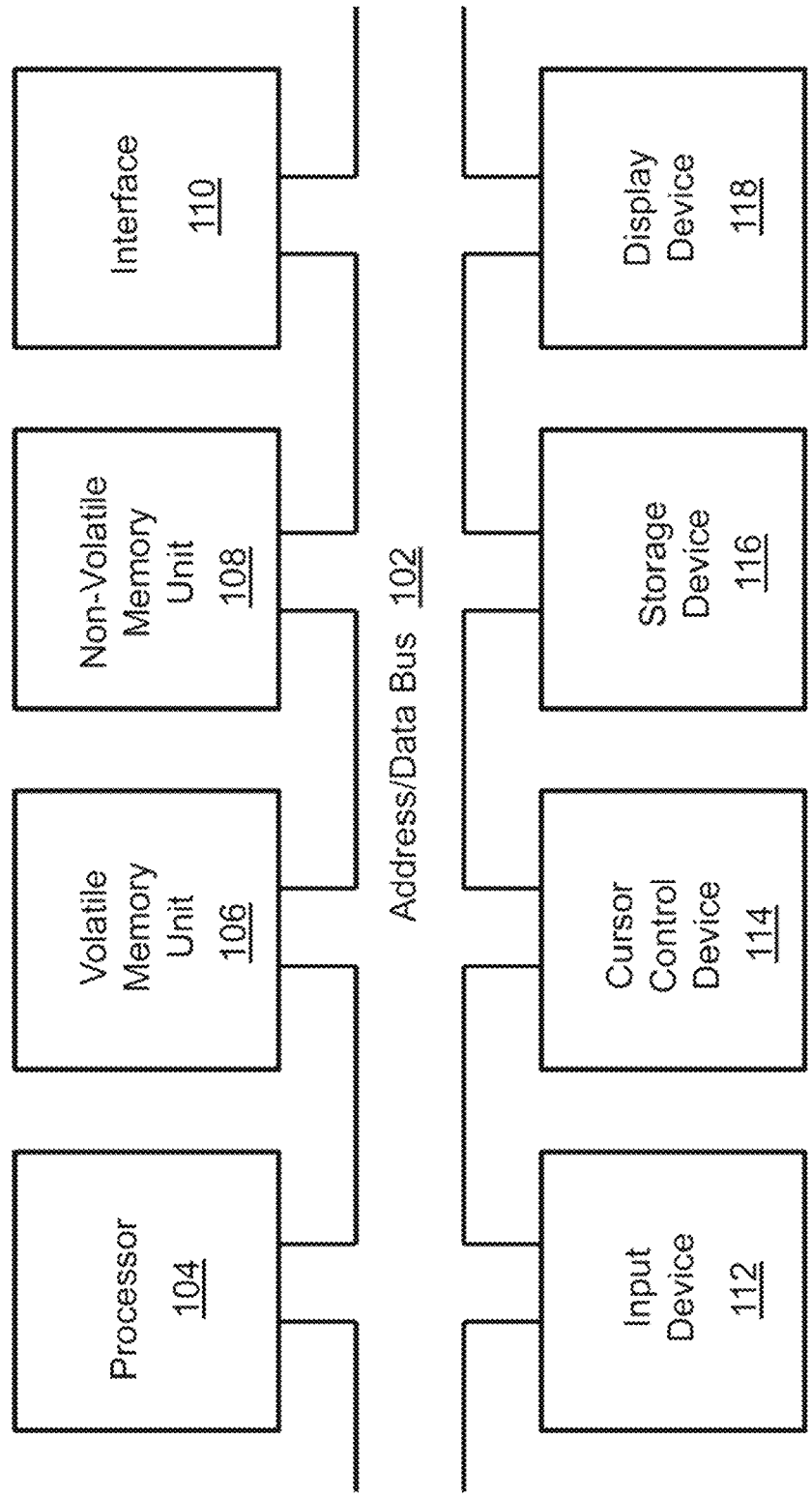
FIG. 1 is a block diagram depicting the components of a system for signal denoising according to some embodiments of the present disclosure.

The present invention relates to a system for signal denoising and, more particularly, to a system for signal denoising with reduced computational and hardware complexity. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. E. Candès and T. Tao, "Near-Optimal Signal Recovery from Random Projections: Universal Encoding Strategies?", IEEE Transactions on Information Theory, vol. 52, no. 12, pp. 5406-5425, 2006.
2. H. Jaeger, et al. "Harnessing nonlinearity: Predicting chaotic systems and saving energy in wireless communications," Science, vol. 304, no. 5667, pp. 78-80, 2004.
3. R. Legenstein, et al. "Edge of Chaos and Prediction of Computational Performance for Neural Microcircuit Models," Neural Networks, 20(3), 2007.
4. W. Maass, "Liquid Computing", Proc. of the Conference CiE'07: COMPUTABILITY IN EUROPE, Siena (Italy), 2007.
5. S. Mann and S. Haykin, "The Chirplet transform: A generalization of Gabor's logon transform", Proc. Vision Interface 1991, pp. 205-212, 3-7, 1991.
6. A. Oppenheim and R. Schafer, "Chapter 7: Filter Design Techniques", in Discrete-Time Signal Processing, Second Edition, pp. 439-540, 1999.
7. F. Takens, "Detecting Strange Attractors in Turbulence," Dynamical Systems and Turbulence, Lecture Notes in Mathematics Vol. 898, 1981.
8. R. Walden, "Analog-to-digital converter survey and analysis," IEEE J. Sel. Areas Commun., vol. 51, pp. 539-548, 1999.
9. H. Yap, et al., "A First Analysis of the Stability of Takens' Embedding," in Proc. of the IEEE Global Conference on Signal and Information Processing (GlobalSIP) symposium on Information Processing for Big Data, December 2014.

(2) Principal Aspects

Various embodiments of the invention include three "principal" aspects. The first is a system for signal denoising. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
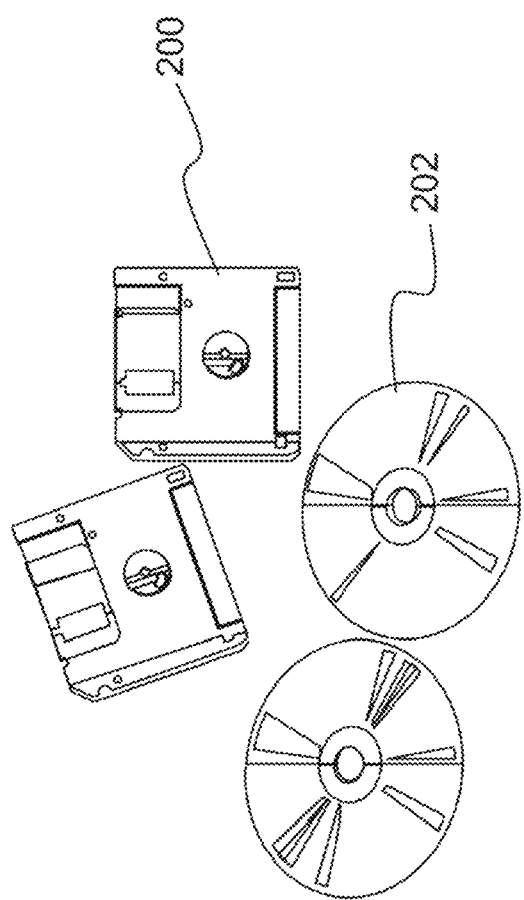
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

The cognitive signal processor (CSP) described herein exhibits several improvements in denoising scenarios relative to existing methods. The CSP performs adaptive filtering, and its hardware-based embodiment requires much less weight and power than current brute-force channelization methods. When instantiated in custom complementary metal-oxide-semiconductor (CMOS) hardware, the CSP can cover an ultra-wide bandwidth of over 30 Gigahertz (GHz) and yet still exhibit very low latencies on the order of 0.1 nanoseconds. In addition, the CSP performs the denoising operation using only a single input antenna.

The system according to embodiments of the present disclosure is capable of denoising signals in real-time using the constraint that the waveforms of interest in a source signal can be linearly predicted over a short interval of time, which can be computed quickly with limited computational cost and covers a wide range of electromagnetic and acoustic signals of interest. Many existing approaches use powerful, but computationally expensive constraints, such as signal complexity measures, or rely on loose constraints, such as filter banks, which may be less computationally expensive but have limited capacity to capture the structure of real-world source signals.

Since the state transition matrix of the reservoir computer according to embodiments of the present disclosure is deterministically designed, the reservoir states each correspond to the amount of signal energy at the output of a particular time-varying filter. This enables the CSP described herein to generate a real-time spectrogram of a complex input signal with respect to a set of nonstationary basis signals (e.g., chirps) that can be implemented efficiently in hardware. Each of these aspects will be described in further detail below.

(3.1) Cognitive Signal Processor (CSP) Denoising Architecture

The CSP described herein can denoise an input signal that contains a time-series of data points from a mixture of waveform signals over a very large (>30 Gigahertz (Ghz)) bandwidth. The CSP consists of multiple components. One component is a reservoir computer (RC), which maps an input signal to a high-dimensional dynamical system known as the reservoir. Another component is a delay embedding that creates a finite temporal record of the values of the reservoir states. Yet another component is a weight adaptation module that adapts the output of the reservoir via gradient descent to produce a prediction of the input signal a small time-step in the future. Since the noise in the input signal is inherently random and unpredictable, the predicted input signal will be free of noise. The error between the predicted input signal and actual input is used by the weight adaptation module to further tune the output weights of the reservoir in an iterative process. Each of these aspects will be described in further detail below.

(3.1.1) Reservoir Computing

Figure 3:
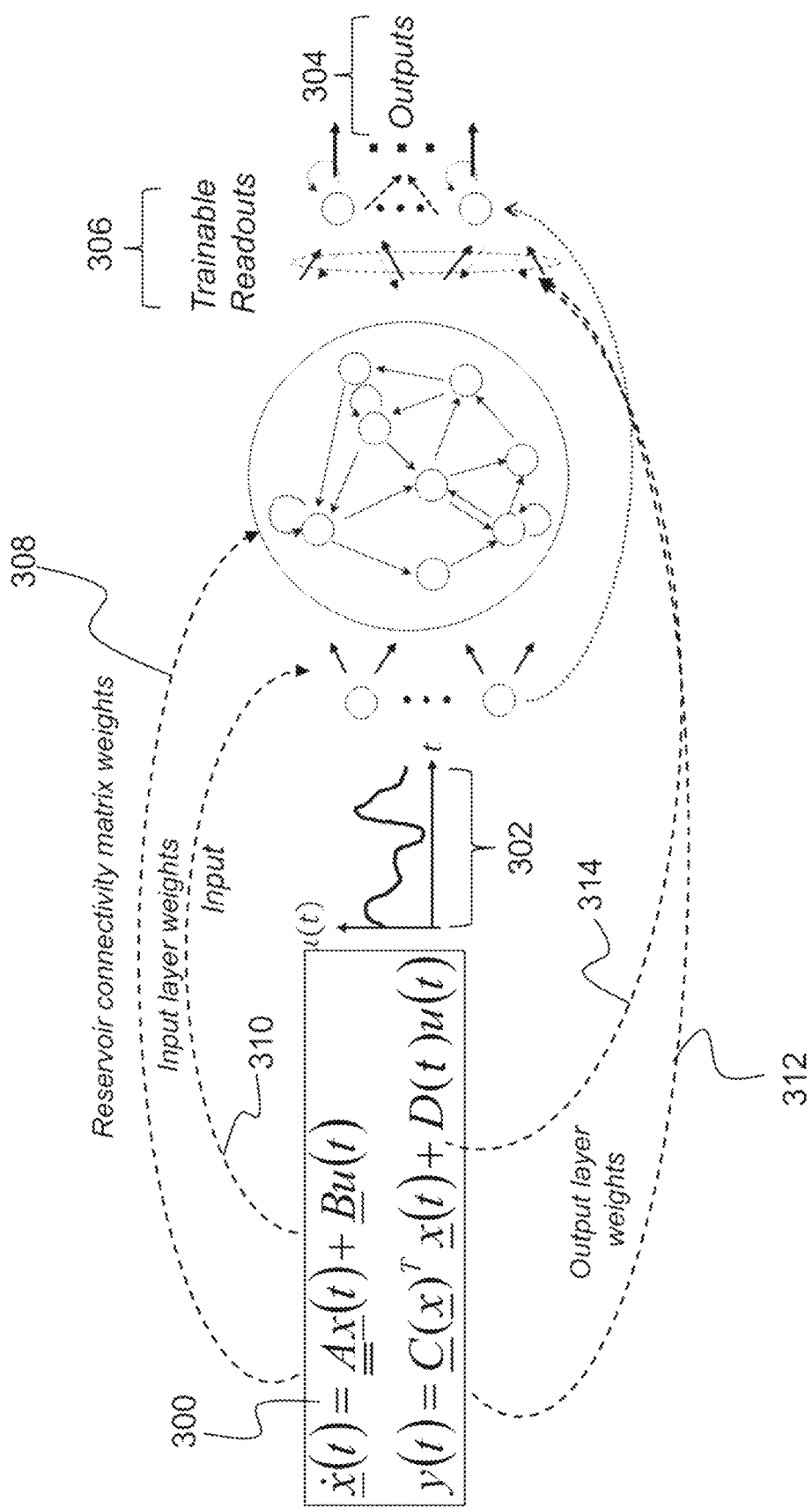
FIG. 3 is an illustration of mapping an input signal vector to a high-dimensional state-space according to some embodiments of the present disclosure.

The cognitive signal denoising architecture is based on a form of neuromorphic (brain-inspired) signal processing known as reservoir computing (RC) (see Literature Reference Nos. 2-4 for a discussion of RC). As shown in FIG. 3, a reservoir computer maps an input signal vector to a high-dimensional state-space 300 that models the underlying time-varying dynamics 302 of the signal generation process. The reservoir states in the high-dimensional state-space 300 can be mapped to useful outputs 304, including denoised inputs, signal classes, separated signals, and anomalies using trainable linear readout layers 306. There is a direct correspondence between state-space representation components and parameters in the reservoir computer.

A RC is a special form of a recurrent neural network (a neural network with feedback connections) that operates by projecting the input signal vector into a high-dimensional reservoir state space 300 which contains an equivalent dynamical model of the signal generation process capturing all of the available and actionable information about the input. A reservoir has readout layers 306 that can be trained, either off-line or on-line, to learn desired outputs 304 by utilizing the state functions. Thus, an RC has the power of recurrent neural networks to model non-stationary (time-varying) processes and phenomena, but with simple readout layers 306 and training algorithms that are both accurate and efficient.

A RC can implement an adaptable state-space filter. A linear RC has the following state-space representation 300:

$$\dot{\underline{x}}(t) = \underline{A}\underline{x}(t) + \underline{B}u(t)$$

$$y(t) = \underline{C}(t)^T\underline{x}(t) + D(t)u(t),$$

where $\underline{A}$ is the reservoir connectivity matrix 308 that determines the filter pole locations, $\underline{B}$ is the vector mapping the input 310 to the reservoir, $\underline{C}(t)$ is the set of tunable output layer weights 312 that map the reservoir state to the output and determine the filter zero locations, and D(t) is the (rarely used) direct mapping 314 from input to output. Similarly, the output layer weights $(\underline{C})$ 312 determine the filter zero locations. FIG. 3 illustrates the direct correspondence between parameters of the state-space representation 300 and components in the reservoir computer. As the output layer weights 312 are adaptable, a RC implements an adaptable state-space filter where the poles are fixed, but the zeros are adapted in real-time based on the input signal.

(3.1.1.1) Optimized Reservoir Design

In conventional RCs, the weights in both the reservoir connectivity matrix $(\underline{A})$ and the input-to-reservoir mapping vector $(\underline{B})$ are typically chosen randomly (e.g., entries of $\underline{A}$ and $\underline{B}$ can be independent, identically distributed samples from a zero-mean, unit variance Gaussian distribution). The reservoir state update requires computation proportional to the square of the number of nodes, which become infeasible for low-power hardware instantiations as the number of reservoir node increases.

Because the RC is a linear dynamical system, a linear transformation $\underline{T}$ can be applied to obtain a new state vector $\underline{\acute{x}}(t) = \underline{T}\underline{\acute{A}}(t)$. The equivalent dynamical system is then obtained:

$$\dot{\underline{\acute{x}}} = \underline{\acute{A}}\underline{\acute{x}}(t) + \underline{\acute{B}}u(t)$$

$$y(t) = \underline{\acute{C}}(t)^T\underline{x}(t) + \acute{D}(t)u(t),$$

where $\underline{\acute{A}} = \underline{T}\underline{A}\underline{T}^{-1}$, $\underline{\acute{B}} = \underline{T}\underline{B}$, $\underline{\acute{C}}(t) = \underline{T}^{-1}\underline{C}(t)$, and $\acute{D}(t) = D(t)$. This dynamical system has the exact same input/output behavior as the original system, but with the appropriate choice of $\underline{T}$, the reservoir transition matrix $\sqrt{\underline{A}}$ can be designed to have a diagonal or block diagonal structure. This will enable the computation of the reservoir state update to scale linearly with the number of nodes, thus enabling efficient implementation in low-power hardware.

U.S. Non-Provisional application Ser. No. 15/910,922 and U.S. Provisional Application No. 62/576,905, which are hereby incorporated by reference as though fully set forth herein, describe a numerical method for transforming an arbitrary real-valued reservoir state transition matrix to have 2×2 block-diagonal form. However, this method can become numerically unstable for large reservoirs (e.g., with greater than 100 nodes). Thus, in the system described herein, the reservoir state transition matrix $\underline{A}$ is directly constructed such that it is in the required 2×2 block diagonal form. Each 2×2 block in the state matrix $\underline{A}$ corresponds to a single pole infinite impulse response (IIR) filter. Using standard IIR filter design techniques known to one skilled in the art, the placement of the pole for each 2×2 block can be selected so that the reservoir state matrix in aggregate models a bank of IIR filters. For example, for a real passive IIR filter, the matrix $\underline{A}$ must have eigenvalues that are either purely real and negative corresponding to purely damped modes, or eigenvalues that come in complex conjugate pairs with negative real parts to the eigenvalues. Thus, the block-diagonal matrix $\underline{A}$ will have the form:

$$\underline{A} = \begin{pmatrix} \lambda_{r,1} & \lambda_{i,1} & 0 & 0 & 0 & \cdots & 0 & 0 \\ -\lambda_{i,1} & \lambda_{r,1} & 0 & 0 & 0 & \cdots & 0 & 0 \\ 0 & 0 & \lambda_{r,2} & \lambda_{i,2} & 0 & \cdots & 0 & 0 \\ 0 & 0 & -\lambda_{i,2} & \lambda_{r,2} & 0 & \cdots & 0 & 0 \\ 0 & 0 & 0 & 0 & \ddots & \ddots & \vdots & \vdots \\ \vdots & \vdots & \vdots & \vdots & \ddots & \ddots & 0 & 0 \\ 0 & 0 & 0 & 0 & \cdots & 0 & \lambda_{r,p} & \lambda_{i,p} \\ 0 & 0 & 0 & 0 & \cdots & 0 & -\lambda_{i,p} & \lambda_{r,p} \end{pmatrix}.$$

Here, p is the number of complex conjugate poles, with N=2p, $\{\lambda_{r,k}\}_{k=1}^{p}$ correspond the real components of the eigenvalues (that are always negative) of $\underline{A}$ and $\{\pm\lambda_{i,k}\}_{k=1}^{p}$ are the imaginary components of the eigenvalues of $\underline{A}$.

(3.1.2) Phase Delay Embedding

Phase delay embedding is a technique developed in dynamical system theory to model the dynamics of a chaotic system from its observation $u_0(t)$ using delayed versions of the observation as new input vector $\underline{u}(t)$. To use phase delay embedding theory, it is assumed that an unknown (potentially chaotic) dynamical system embedded in an N-dimensional state space has an m-dimensional attractor. This means that though the state space has N parameters, signals from the dynamical system form trajectories that all lie on an m-dimensional sub-manifold M of the state space, and can theoretically (though not practically) be specified by as few as m parameters. The observations (received signal) $u_0(t)$=h[$\underline{x}(t)$] is a projection of the state space. The phase delay embedding produces a new input vector $\underline{u}(t)$ from n delayed versions of the observation signal $u_0(t)$ concatenated together. According to Taken's theorem (see Literature Reference No. 7), given fairly broad assumptions on the curvature of the sub-manifold M and the nondegenerate nature of the projection h[•], if the number of delay coordinate dimensionality n>2m+1, then the phase delay embedding $\underline{u}(t)$ preserves the topological structure (i.e., shape) of the dynamical system, and thus can be used to reconstruct the dynamical system from observations.

Figure 4:
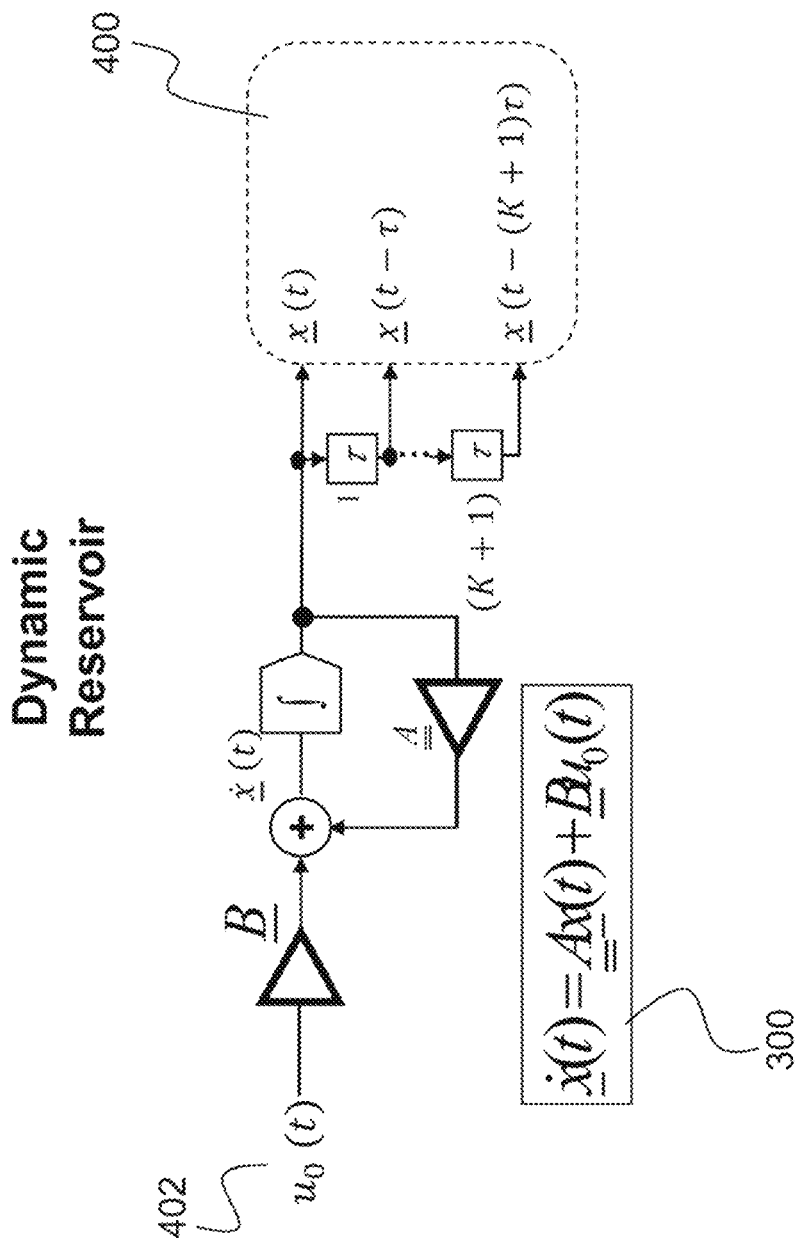
FIG. 4 is an illustration of applying a delay embedding to the reservoir states to provide a time history of reservoir dynamics according to some embodiments of the present disclosure.

More recent work in Literature Reference No. 9 shows that the delay coordinate dimensionality can be increased more (but still not a function of the ambient dimensionality N) to be able to preserve both the topology and geometry of the dynamical system, without complete knowledge of the dynamical system or the observation function. As shown in FIG. 4, in the system described herein, the delay-embedding is applied to each of the reservoir states to obtain a short-time history of the reservoir state dynamics 400.

(3.1.3) Short-Time Prediction via Gradient Descent

Described below is the short-term prediction method that the system according to embodiments of the present disclosure uses for signal denoising. Given that delay-embedded observations can effectively model dynamical system behavior, the system leverages the time history of these reservoir state variables to perform short-term predictions of the observations. The invention uses a reservoir computer to learn the prediction function F:

$$\tilde{u}_o(t+\tau)=F[u_0(t)].$$

In the CSP according to embodiments of the present disclosure, a wideband (up to 30 GHz) frontend provides input to the dynamic reservoir. The weights of the output layers are adapted via the gradient learning algorithm. The gradient descent learning algorithm is based on short-time prediction of the input signal, seeking to represent the output as a linear combination of historical reservoir state. Since noise is random and unpredictable, the predicted signal $y(t) \doteq \tilde{u}_0(t+\tau)$ will be free of noise.

The dynamic reservoir in FIG. 4 satisfies the following set of coupled ordinary differential equations (ODE):

$$\dot{x}(t) = \underline{A}\underline{x}(t) + \underline{B}u_0(t)$$

$$y(t) = \sum_{k=1}^{K+1} \underline{c}_k(t)^T \underline{x}(t-(k-1)\tau) + \underline{d}(t)^T \underline{u}(t),$$

where $\underline{u}(t) \doteq [u_0(t), u_0(t-\tau), \ldots, u_0(t-K\tau)]^T$. To perform short-time prediction of the input signal 402, the invention described herein uses an online gradient descent algorithm. The idea is to enforce exact prediction of the current time point that is used in the delay embedding. The predicted input value at time (t+τ) is calculated from the current value of the output weights ($\underline{c}_k(t)$, $\underline{d}(t)$) and the current and past values of the states ($\underline{x}$) and the input ($\underline{u}$). The quadratic error function to be minimized is given by:

$$E[\underline{c}_1, \ldots, \underline{c}_{K+1}, \underline{d}] \doteq [u_0(t) - \tilde{y}(t-\tau)]^2 + \lambda_c \sum_{k=1}^{K+1} \|\underline{c}_k(t)\|^2 + \lambda_d \|\underline{d}(t)\|^2,$$

where $\lambda_c$ and $\lambda_d$ are parameters that weight the importance of the output weights $\{\underline{c}_k\}_{k=1}^{K+1}$ and $\underline{d}$, and $$\tilde{y}(t-\tau) = \sum_{k=1}^{K+1} \underline{c}_k(t)^T \underline{x}(t-k\tau) + \underline{d}(t)^T \underline{u}(t-\tau).$$

Note that $\tilde{y}(t-\tau)$ is the delayed output expressed by the delayed valued of $\underline{x}$ and $\underline{u}$ and the current values of the output weights $\{\underline{c}_k\}_{k=1}^{K+1}$ and $\underline{d}$, and, thus, in general $\tilde{y}(t-\tau) \neq y(t-\tau)$. However, this approximation is reasonable, and allows the system to not require storage of time histories of output weights, facilitating more efficient hardware implementation.

To minimize the quadratic error $E[\underline{c}_1, \ldots, \underline{c}_{K+1}, \underline{d}]$, compute the gradients of $E[\underline{c}_1, \ldots, \underline{c}_{K+1}, \underline{d}]$ with respect to $\{\underline{c}_k\}_{k=1}^{K+1}$ and $\underline{d}$. Based on these gradients, the weight updates to $\{\underline{c}_k(t)\}_{k=1}^{K+1}$ and $\underline{d}(t)$ satisfy the following ordinary differential equations (ODEs):

$$\dot{\underline{c}}_k(t) = g_c \underline{c}_k(t) + \mu_c \tilde{\varepsilon}(t) \underline{x}(t-k\tau), k=1,2,\ldots,K+1$$

$$\dot{\underline{d}}(t) = -g_d \underline{d}(t) + \mu_d \tilde{\varepsilon}(t) \underline{u}(t-\tau),$$

where $g_c = 2\lambda_d$ and $g_d = 2\lambda_d$ is the "forgetting" rates with respect to $\{\underline{c}_k\}_{k=1}^{K+1}$ and $\underline{d}$, $\mu_c$ and $\mu_d$ are the learning rates with respect to $\{\underline{c}_k\}_{k=1}^{K+1}$ and $\underline{d}$, and $\tilde{\varepsilon}(t) = u_0(t) - \tilde{y}(t-\tau)$ is the error signal.

The ODEs for the dynamic reservoir and the weight adaptation system can be implemented directly in analog hardware. To implement the above ODEs in software or efficient digital hardware (e.g., field-programmable gate arrays (FPGAs) or custom digital application-specific integrated circuits (ASICs)), the update equations must be discretized.

For implementing the invention in software or digital hardware, the ODEs are converted to delay difference equations (DDEs). For a linear dynamical system with the state-space representation:

$$\dot{\underline{x}}(t) = \underline{A}\underline{x}(t) + \underline{B}u(t)$$

$$y(t) = \underline{C}(t)^T \underline{x}(t) + D(t)u(t),$$

given the discrete time-step size $\tau$, the equivalent DDE is obtained that describes the exact same filter dynamics according to the following:

$$\underline{x}(t) = e^{\underline{A}\tau} \underline{x}(t-\tau) + \int_{t-\tau}^{t} e^{\underline{A}(t-s)} u(s) ds \cdot \underline{B}$$

$$y(t) = \underline{C}(t)^T \underline{x}(t) + D(t)u(t).$$

Figure 5A:
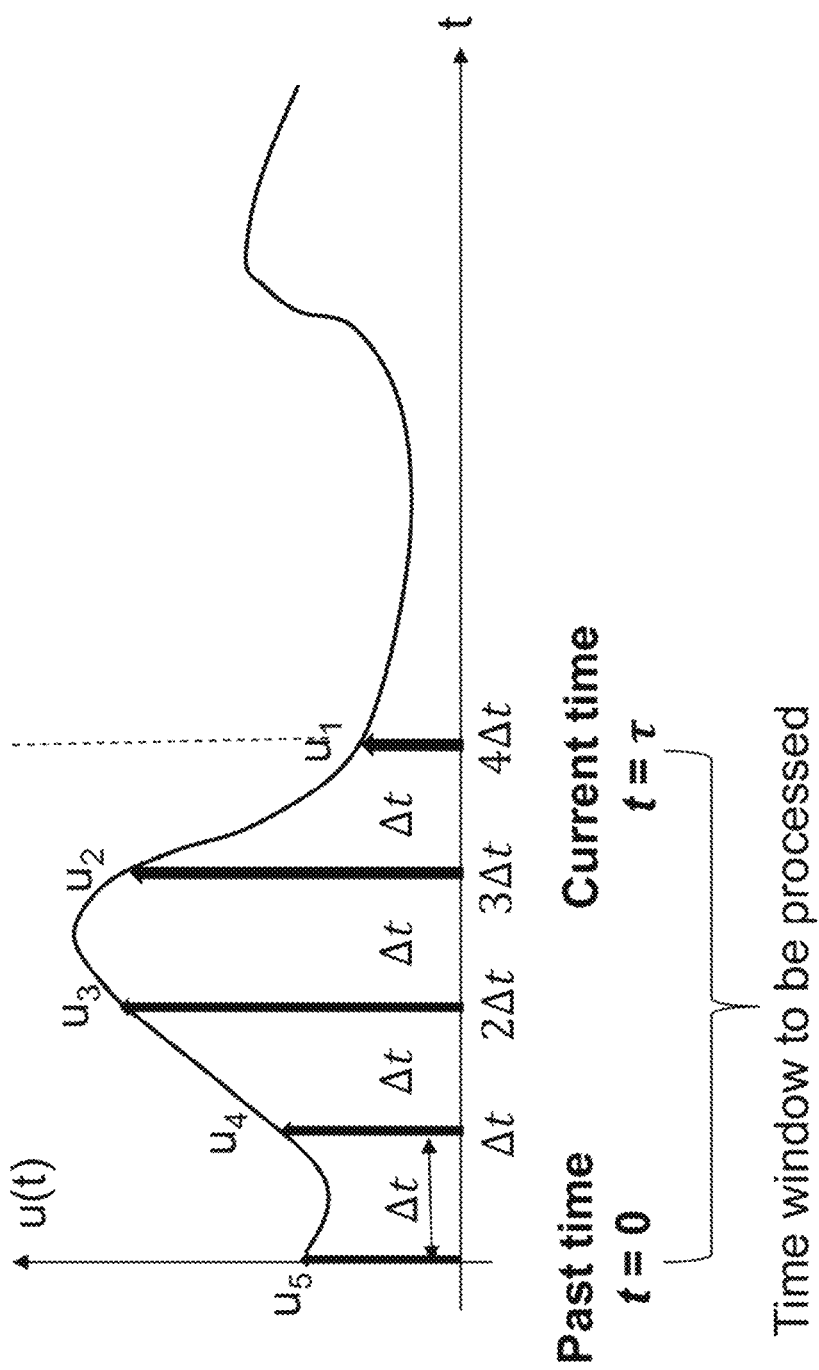
FIG. 5A is an illustration of a plot of an approximation of an input signal using uniform sampling according to some embodiments of the present disclosure.
Figure 5B:
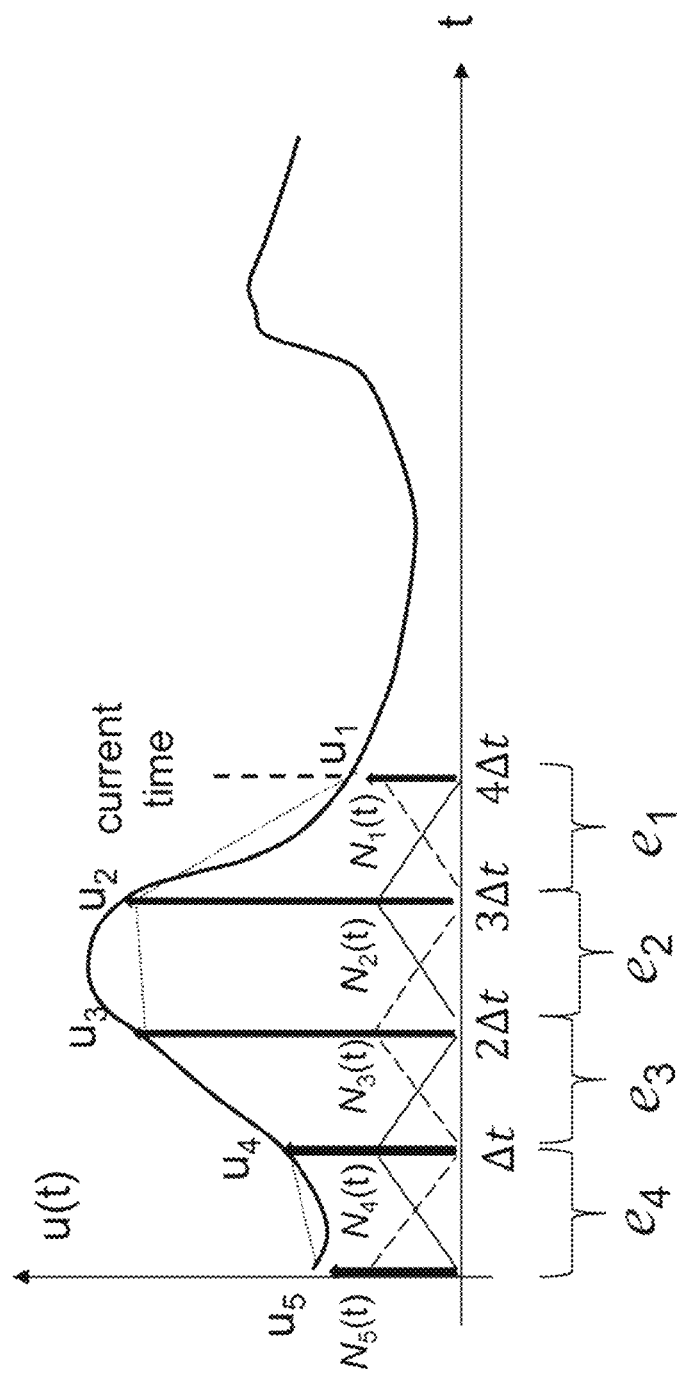
FIG. 5B is an illustration of a plot of an approximation of an input signal using a linear basis function according to some embodiments of the present disclosure.

This shows that the current reservoir state $\underline{x}(t)$ is a function of the reservoir state at the previous time step $\underline{x}(t-\tau)$ and the input signal $u(t)$ over the interval $[t-\tau, t]$. Since the entire continuous interval is not available in software or digital hardware, in the digital CSP described herein $u(t)$ is approximated over the interval using linear basis functions. FIG. 5A is a plot showing a uniformly sampled input signal $u(t)$ with sampling period $\Delta t$. FIG. 5B is a plot showing linear basis functions for approximating $u(t)$. Given the sampling period $\Delta t$, $u(t)$, a set of samples $u_i \triangleq u(t-(i-1)\Delta t)$, $1 \leq i \leq n_e+1$ is collected, where $$n_e = \frac{\tau}{\Delta t}$$

in the number of sampling intervals within the time window defined by $\tau$ (FIG. 5A). As illustrated in FIG. 5B, the input signal is approximated from the samples as $$u(t) \approx \sum_{i=1}^{n_e+1} u_i N_i(t),$$

where $N_i(t) = T(t-(i-t)\Delta t)$ is a shifted version of the triangle function $T(t)$:

$$T(t) = \begin{cases} 1 - t/\Delta t & 0 \leq t \leq \Delta t \\ 1 + t/\Delta t & -\Delta t \leq t \leq 0 \\ 0 & \text{otherwise} \end{cases}.$$

Based on the linear basis approximation, the DDE for the reservoir state $\tilde{x}(t)$ becomes $$\underline{x}(t) = e^{\underline{A}\tau} \underline{x}(t-\tau) + \sum_{i=1}^{n_e+1} \left\{ u_i \int_{t-\tau}^{t} e^{\underline{A}(t-s)} N_i(s) ds \cdot \underline{B} \right\}.$$

Without loss of generality, set $t=\tau$. If the two auxiliary matrices are defined as $\underline{B}_{1e}^i$ and $\underline{B}_{2e}^i$;

$$\underline{B}_{1e}^i \stackrel{def}{=} e^{\underline{A}(i-1)\Delta t} \int_0^{\tau} e^{\underline{A}(\tau-s)} N_1(s) ds \cdot \underline{B} = \frac{e^{\underline{A}(i-1)\Delta t}}{\Delta t} \underline{A}^{-2} (e^{\underline{A}\Delta t} - \Delta t \underline{A} - I) \underline{B}$$

$$\underline{B}_{2e}^i \stackrel{def}{=} e^{\underline{A}(i-1)\Delta t} \int_0^{\tau} e^{\underline{A}(\tau-s)} N_2(s) ds \cdot \underline{B} =$$

$$e^{\underline{A}(i-1)\Delta t} \left\{ \underline{A}^{-1}(e^{\underline{A}\Delta t} - I) - \frac{1}{\Delta t}\underline{A}^{-2}(e^{\underline{A}\Delta t} - \Delta t\underline{A} - I) \right\} B,$$

then $\underline{x}(\tau)$ can be computed as:

$$\underline{x}(t) =$$

$$x(n_e \Delta t) = \underbrace{e^{\underline{A}\tau}}_{\tilde{A}} x(0) + \underbrace{[\underline{B}_{1e}^1, (\underline{B}_{2e}^1 + \underline{B}_{1e}^2), \ldots, (\underline{B}_{2e}^{n_e-1} + \underline{B}_{1e}^{n_e}), \underline{B}_{2e}^{n_e}]}_{B} \begin{bmatrix} u_1 \\ u_2 \\ \vdots \\ u_{n_e} \\ u_{n_e+1} \end{bmatrix}$$

Figure 6:
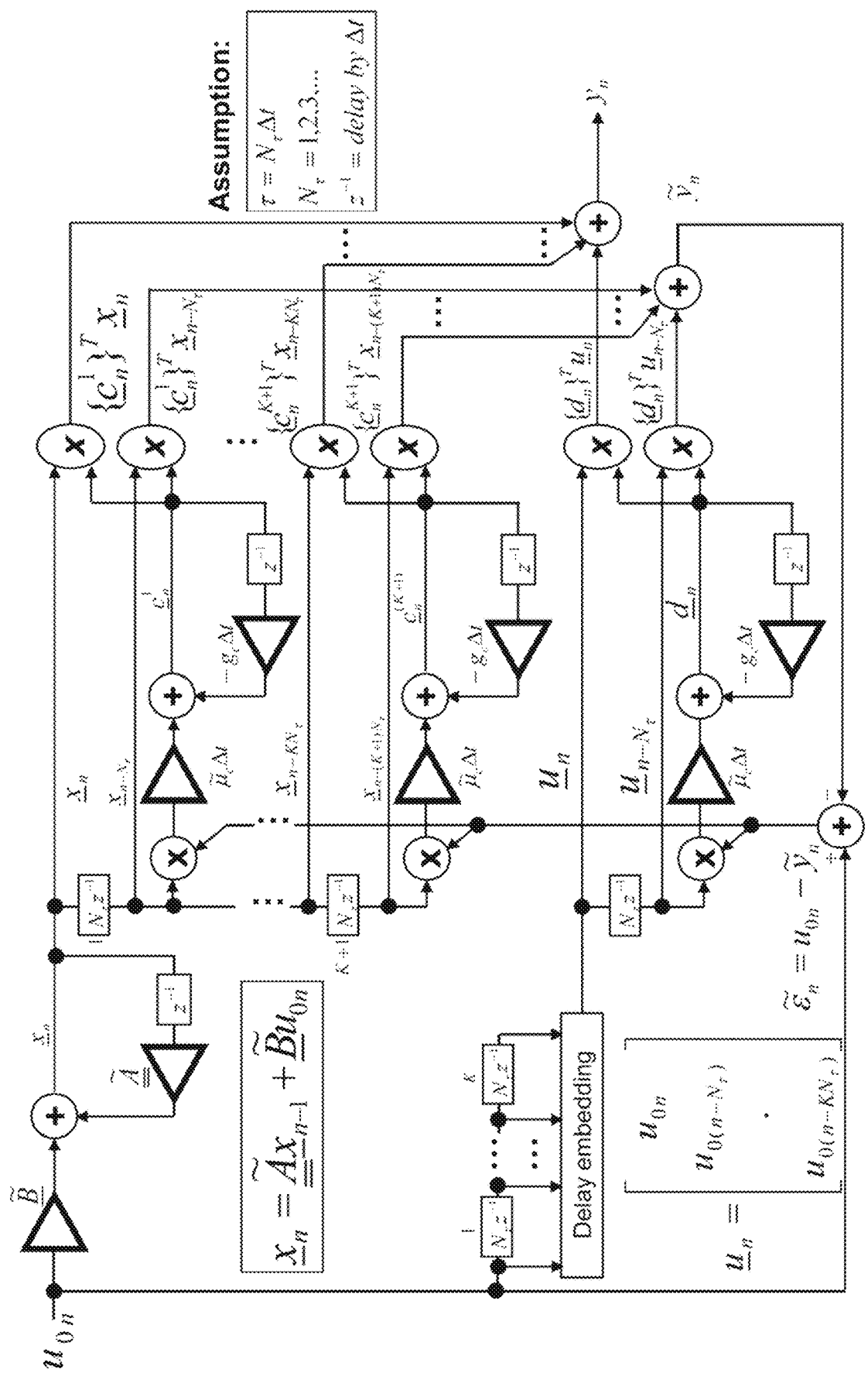
FIG. 6 is an illustration of a discrete time architecture of a cognitive signal processor (CSP) according to some embodiments of the present disclosure.

Based on the above, iterative updates are derived for the state ($\underline{x}$), output (y), and weights ($\{\underline{c}_k\}_{k=1}^{K+1}$, $\underline{d}$), which is summarized in Algorithm 1 below. Each required update step is achieved within one clock cycle without the need of waiting for a calculation step to be completed before a subsequent step can start. This enables a parallelized implementation of the de-noising algorithm. The architecture for a system implementing the above iteration is shown in FIG. 6 and is amenable to implementation on an FPGA or custom digital ASIC.

Algorithm 1: Cognitive Signal Denoising Iterative Algorithm

Initialization:

$$\underline{x}[k] = \underline{0}, \underline{c}_k[K+1] = 0$$

k=1, 2, . . . , (K+1)

Iteration (Starting at n=K+2):

$$x[n] = \underline{\tilde{A}} x[n-1] + \underline{\tilde{B}} \begin{bmatrix} u[n] \\ u[n-1] \\ \vdots \\ u[n-n_e] \\ u[n-(n_e+1)] \end{bmatrix}$$

$$\tilde{\varepsilon}[n] = u[n-1] - y[n-1]$$

$$\underline{c}_k[n] = (1 - \Delta t g_c) \underline{c}_k[n-1] + \Delta t \tilde{\mu}_c \tilde{\varepsilon}[n] \underline{x}[n-1-k]$$

k = 1, 2, . . . , (K+1)

$$y[n] = \sum_{k=1}^{K+1} \underline{c}_k[n]^T \underline{x}[n-k]$$

(3.2) Time-Varying Reservoir

In this section the derivation of the discretized state-space representation for the time-varying reservoir is described. For ease of exposition, it is assumed that $\Delta t=\tau$, and consequently, $n_e=1$. Recall from Algorithm 1 above that the discretized state update equations for the dynamic reservoir with delay-embedded states is given by the following:

$$x[n] = \underline{\tilde{A}}\underline{x}[n-1] + \underline{\tilde{B}}\begin{bmatrix} u[n] \\ u[n-1] \end{bmatrix}$$

$$y[n] = \sum_{k=1}^{K+1} c_k[n]^T \underline{x}[n-(k-1)] + d[n]u[n].$$

Grouping together the current state vector with the past K delayed state vectors $$\underline{\hat{x}}[n] \overset{def}{=} [\underline{x}[n], \underline{x}[n-1], \ldots, \underline{x}[n-k]]^T,$$

the phase delay embedding can be incorporated into the state-space representation of the dynamic reservoir as follows:

$$\begin{bmatrix} \underline{x}[n] \\ \underline{x}[n-1] \\ \underline{x}[n-2] \\ \vdots \\ \underline{x}[n-K] \end{bmatrix} = \underbrace{\begin{bmatrix} \tilde{A} & 0 & 0 & \ldots & 0 \\ I & 0 & 0 & \ldots & 0 \\ 0 & I & 0 & \ldots & 0 \\ \vdots & \ddots & \ddots & \ddots & \vdots \\ 0 & 0 & 0 & I & 0 \end{bmatrix}}_{\underline{\hat{A}}} \begin{bmatrix} \underline{x}[n-1] \\ \underline{x}[n-2] \\ \underline{x}[n-3] \\ \vdots \\ \underline{x}[n-(K+1)] \end{bmatrix} + \underbrace{\begin{bmatrix} \tilde{B} \\ 0 \\ 0 \\ \vdots \\ 0 \end{bmatrix}}_{\underline{\hat{B}}} \begin{bmatrix} u[n] \\ u[n-1] \end{bmatrix}$$

$$\underline{\hat{x}}[n] = \underline{\hat{A}}\underline{\hat{x}}[n-1] + \underline{\hat{B}}\begin{bmatrix} u[n] \\ u[n-1] \end{bmatrix}$$

$$y[n] = \underline{\hat{c}}[n]^T \underline{\hat{x}}[n] + d[n]u[n].$$

This shows that a linear reservoir with N nodes combined with the phase delay embedding of size K is just a linear reservoir with (K+1)N nodes, where the state transition matrix $\underline{\hat{A}}$ and input-to-reservoir map $\underline{\hat{B}}$ have the above structured forms. The identity matrices are a computationally efficient mechanism for applying a static reservoir state transition matrix $\underline{\hat{A}}$ to the history of reservoir states. A time-varying reservoir can, thus, be obtained by applying a different state transition matrix $A_i$ for each delayed state $\underline{x}[n-i]$:

$$\begin{bmatrix} \underline{x}[n] \\ \underline{x}[n-1] \\ \vdots \\ \underline{x}[n-K] \end{bmatrix} = \begin{bmatrix} A_0 & 0 & \ldots & 0 \\ 0 & A_1 & \ldots & 0 \\ \vdots & \vdots & \ddots & \vdots \\ 0 & 0 & \ldots & A_K \end{bmatrix} \begin{bmatrix} \underline{x}[n-1] \\ \underline{x}[n-2] \\ \vdots \\ \underline{x}[n-(K+1)] \end{bmatrix} +$$

$$\begin{bmatrix} \tilde{B}_1 & \tilde{B}_2 & 0 & \ldots & 0 & 0 \\ 0 & \tilde{B}_1 & \tilde{B}_2 & \ldots & 0 & 0 \\ \vdots & \vdots & \vdots & \ddots & \vdots & \vdots \\ 0 & 0 & 0 & \ldots & \tilde{B}_1 & \tilde{B}_2 \end{bmatrix} \begin{bmatrix} u[n] \\ u[n-1] \\ \vdots \\ u[n-(K+1)] \end{bmatrix},$$

where $\underline{\tilde{B}}_1$ and $\underline{\tilde{B}}_2$ are first and second columns of the discretized input-to-reservoir map $\tilde{B}$. Since a different state transition matrix $A_i$ is applied to each delayed state $\underline{x}[n-(i+1)]$, this time-varying reservoir computer can be used to detect and de-noise nonstationary signals. In general, using the time-varying reservoir increases the amount of computation required to compute the reservoir state update by a factor of K.

As a non-limiting example, the following is a description of how to design the time-varying reservoir for optimally de-noising linear chirp signals. The state transition matrix $A_0$ for the first sub-reservoir is constructed to have N=2p poles distributed uniformly in some band of interest (e.g., between 10 megahertz (Mhz) and 500 Mhz) according to a Chebyshev low-pass filter prototype (see Literature Reference No. 6). The sub-reservoir specified by $A_0$ will have resonances at frequencies $f_1 \ldots f_p$. Then, construct $A_1 \ldots A_K$ to have rows that are cyclically shifted versions of the rows of $A_0$. The jth row of the state transition matrix of $A_i$ is given by:

$$A_{i(j)} = \begin{cases} A_{0(j+2i)} & 1 \leq j \leq 2p-2i \\ A_{0(j+2i-2p)} & i=2p-i < j \leq 2p \end{cases}.$$

The sub-reservoirs specified by $A_1 \ldots A_K$ all have the same resonant frequencies as $A_0$, but are applied to different elements of the state vector. Thus, for a linear chirp signal $$u(t) = \sin\left(\phi_0 + 2\pi\left(f_1 + \frac{f_p - f_1}{T}t\right)\right)$$

with sweep rate T, the same state of the time-varying reservoir will detect and track this signal as it sweeps from frequency $f_1$ to frequency $f_p$. Note that for the chirp-optimized reservoir, because each $A_i$ is a permuted version of $A_0$, the computation of the reservoir state update is not significantly increased compared to the static reservoir.

(3.3) Real-Time Chirplet Spectrogram Using Reservoir States

In U.S. application Ser. No. 15/910,922, it was shown that the set of de-noised reservoir states can be interpreted as the output of a bank of narrow bandwidth 1-pole IIR filters and, thus, can be used as a clean spectrogram of the input signal that is obtained in real-time without the use of computationally expensive techniques, such as channelizers or the Fast Fourier Transform. In the embodiment described herein, because the states are for a time-varying reservoir, they can be interpreted as the response to a bank of time-varying filters. Therefore, for the chirp-optimized reservoir described above, the set of reservoir states form a chirplet spectrogram (see Literature Reference No. 5). This chirplet spectrogram can be used for a variety of real-time signal analysis tasks, such as detection, separation, and tracking of individual radar pulses within an input wideband signal mixture. U.S. application Ser. Nos. 15/452,155 and 15/817,906, which are hereby incorporated by reference as though fully set forth herein, describe examples of blind source separation systems that can leverage the spectrogram output of the system described herein. The chirplet spectrogram output is demonstrated on synthetic and real wideband signals in experimental studies.

(3.4) Experimental Studies

This section includes a comparison of the denoising performance of the CSP according to embodiments of the present disclosure with a time-varying reservoir to prior art with a static reservoir on a simulated scenario, where the input signal contains mixtures of radar pulse waveforms and noise. All of the following results were demonstrated in a software simulation of the architecture in FIG. 6.

Figure 7A:
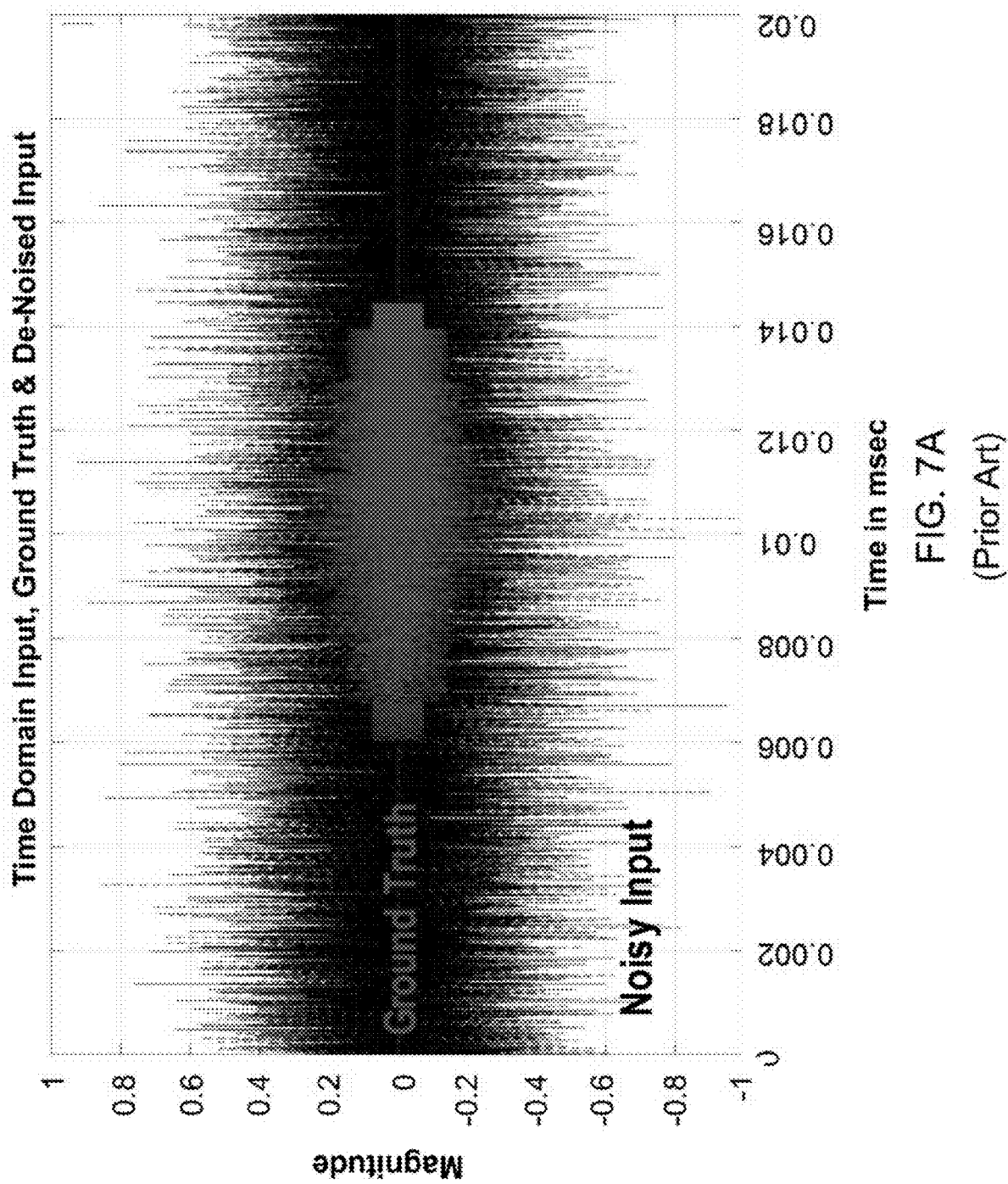
FIG. 7A is an illustration of time-domain noisy input and ground truth signals according to some embodiments of the present disclosure.
Figure 7B:
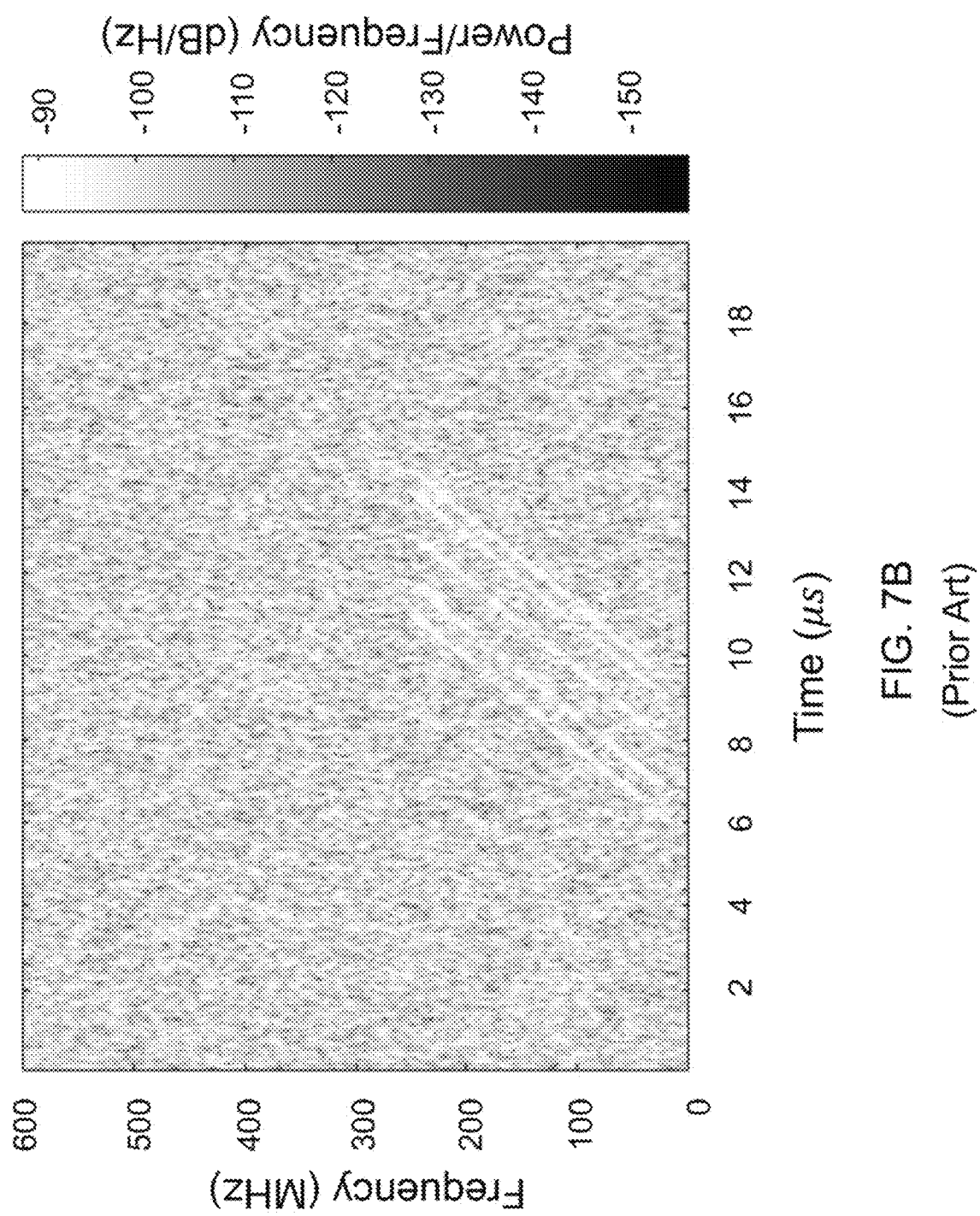
FIG. 7B is an illustration of a spectrogram of noisy input signal according to some embodiments of the present disclosure.
Figure 7C:
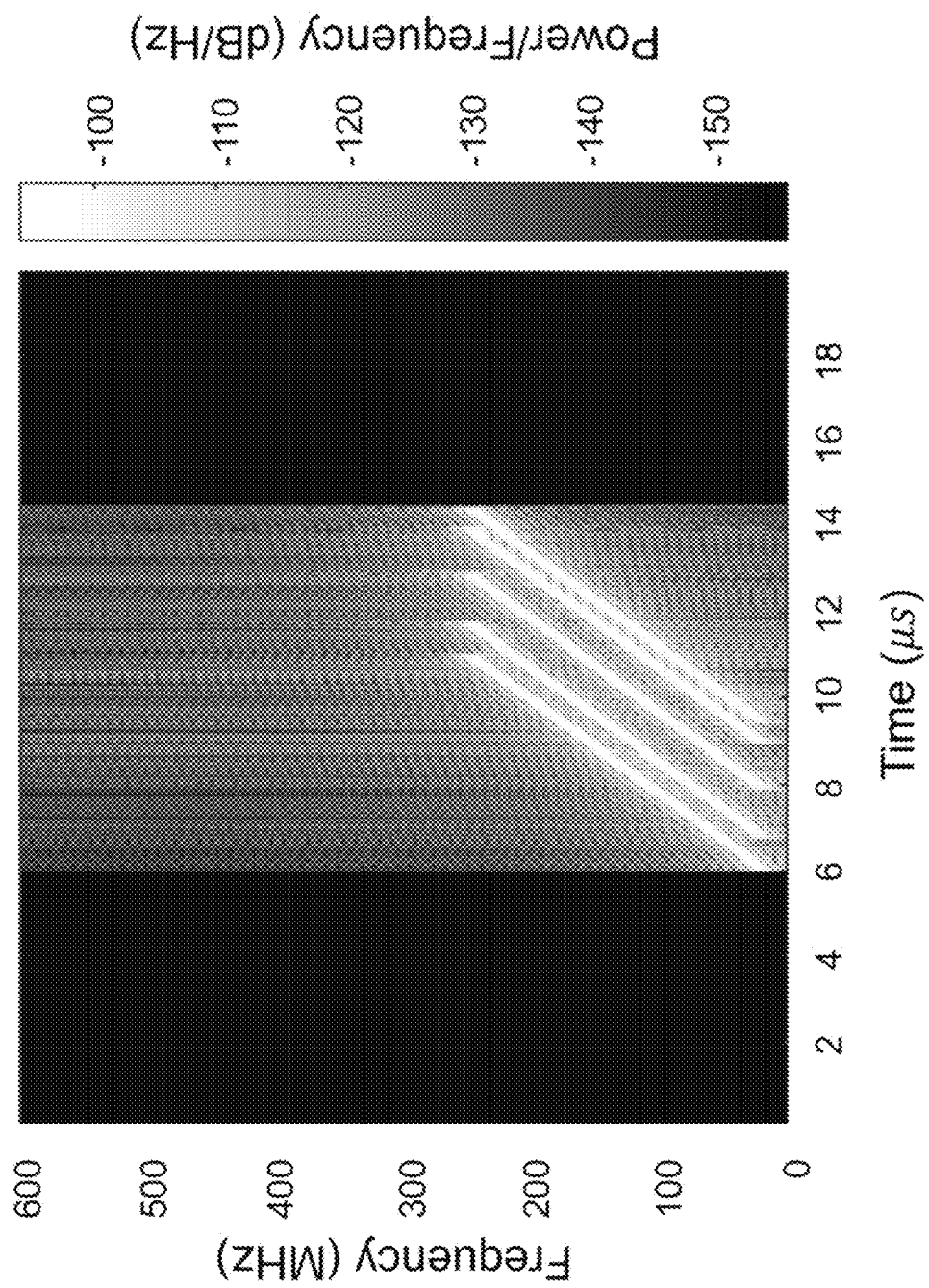
FIG. 7C is an illustration of a spectrogram of ground truth signal according to some embodiments of the present disclosure.

In the simulated scenario of the prior art static reservoir shown in FIGS. 7A-7C, the signal consists of 5 linear up-chirp RF pulses that each have a pulse length of 1.6 microseconds (us), sweep from 50 Mhz to 230 Mhz, and have a chirp rate $31.831*10^{-6}$ Hz/s. The simulation time length is 20 us and the bandwidth is 500 Mhz. The average SNR is −25 decibels (dB). FIG. 7A shows a time-domain plot of the noisy input signal in black and the ground-truth signal without noise. FIG. 7B shows a spectrogram plot of the noisy input signal. FIG. 7C shows a spectrogram plot of the ground truth signal. Note that the chirp signals are not visible in the time-domain plot of the noisy signal, and barely visible in the spectrogram of the noisy signal.

Figure 8A:
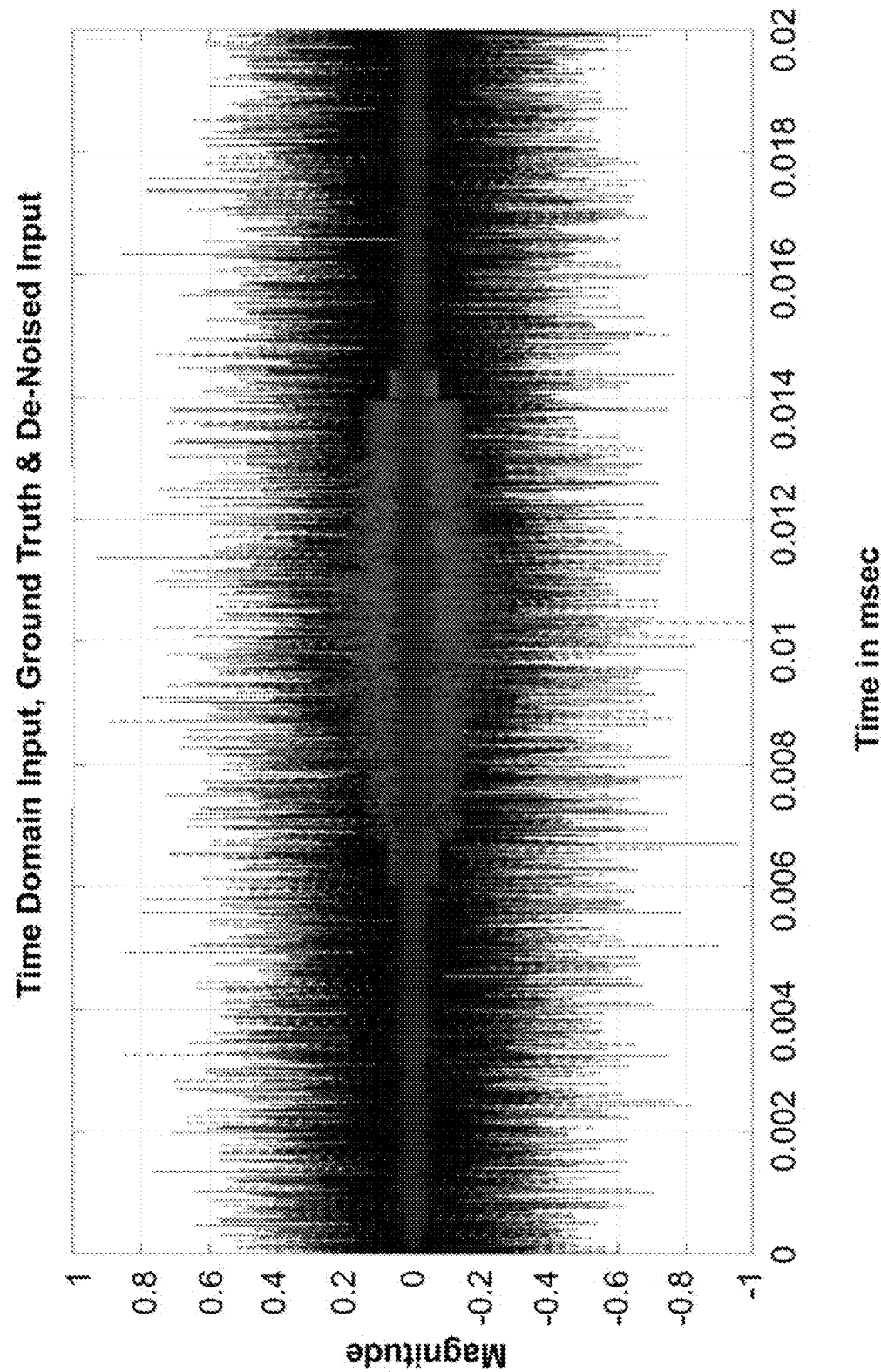
FIG. 8A is an illustration of time domain plots of an input signal, an input without noise, and a predictive filter response generated by a CSP with a static reservoir according to prior art.
Figure 8B:
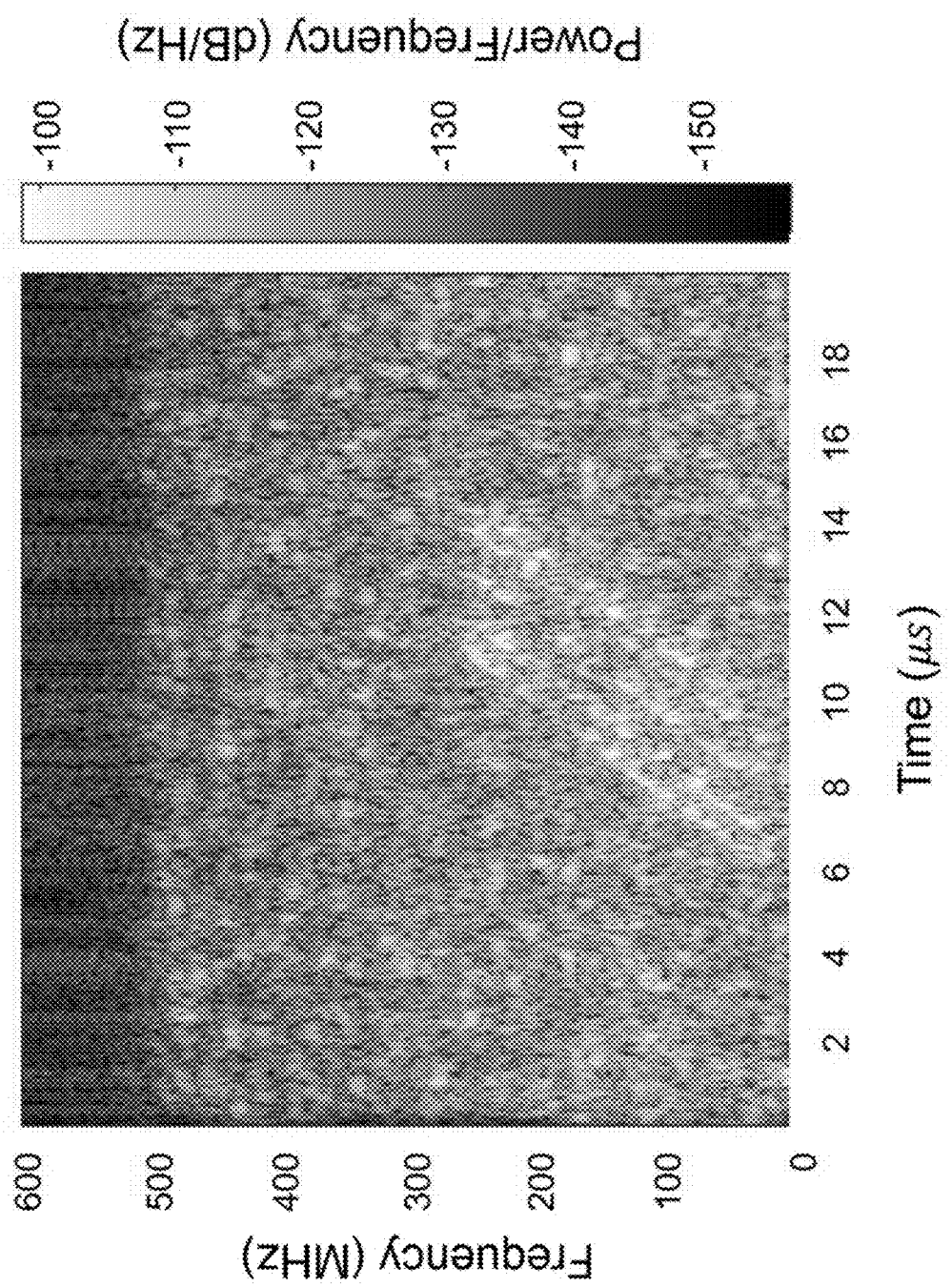
FIG. 8B is an illustration of a spectrogram of a denoised signal generated by a CSP with a static reservoir according to prior art.

FIGS. 8A and 8B show denoising results for the simulated scenario in FIGS. 7A-7C using a prior art CSP with a static reservoir. The CSP has a 32-node reservoir, with poles distributed uniformly between 10 Mhz and 500 Mhz, according to a Chebyshev low-pass filter prototype (see Literature Reference No. 6). FIG. 8A shows the time domain waveforms of the original noisy input (black), de-noised output (blue), and ground truth (red). FIG. 8B shows the spectrogram plot of the de-noised output signal. The CSP with static reservoir does not provide a significant improvement in SNR, because the rapidly changing up-chirp signals are not linearly predictable using a static reservoir.

Figure 9A:
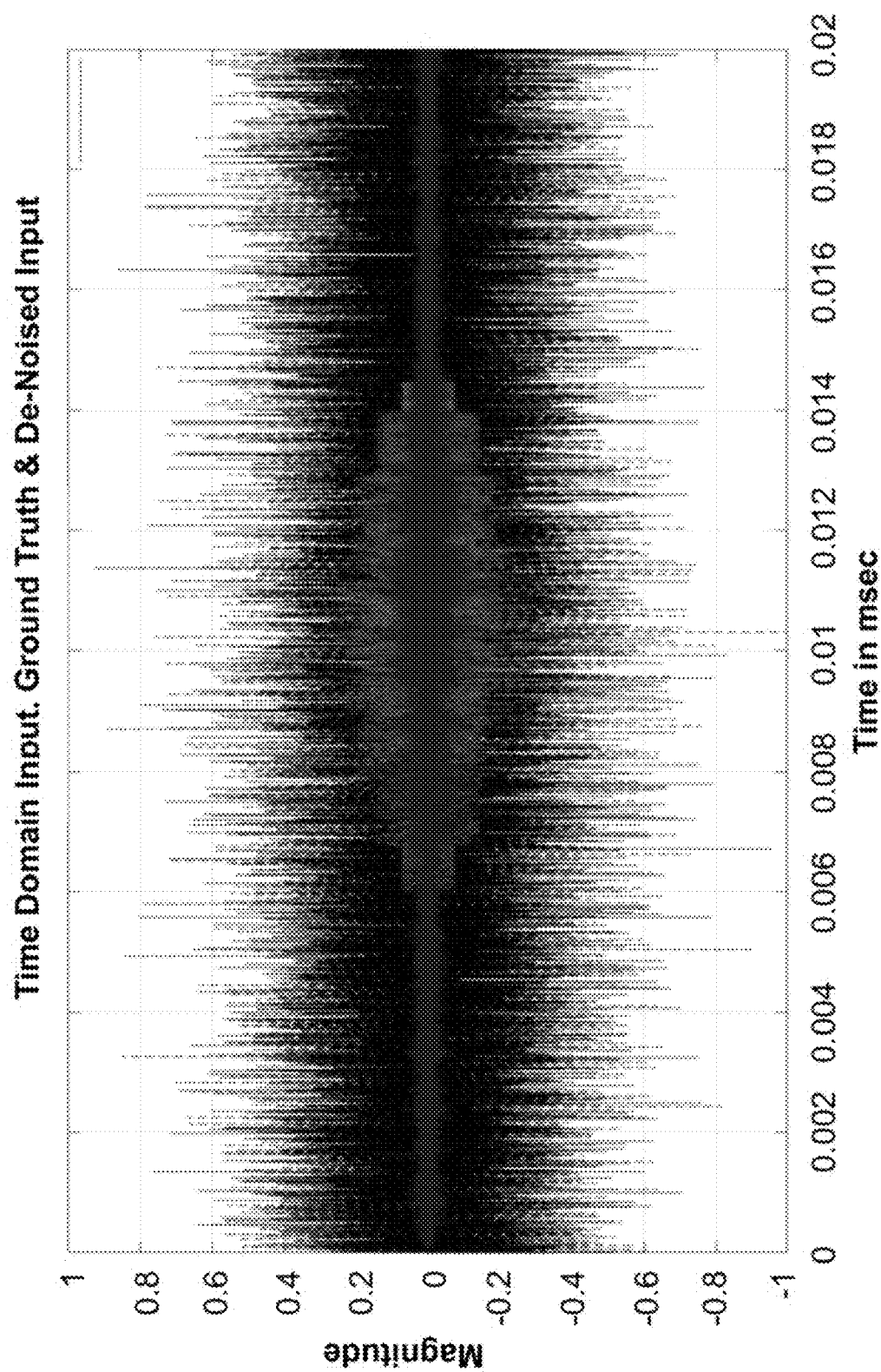
FIG. 9A is an illustration of time domain plots of an input signal, an input without noise, and a predictive filter response generated by a CSP with a time-varying reservoir according to some embodiments of the present disclosure.
Figure 9B:
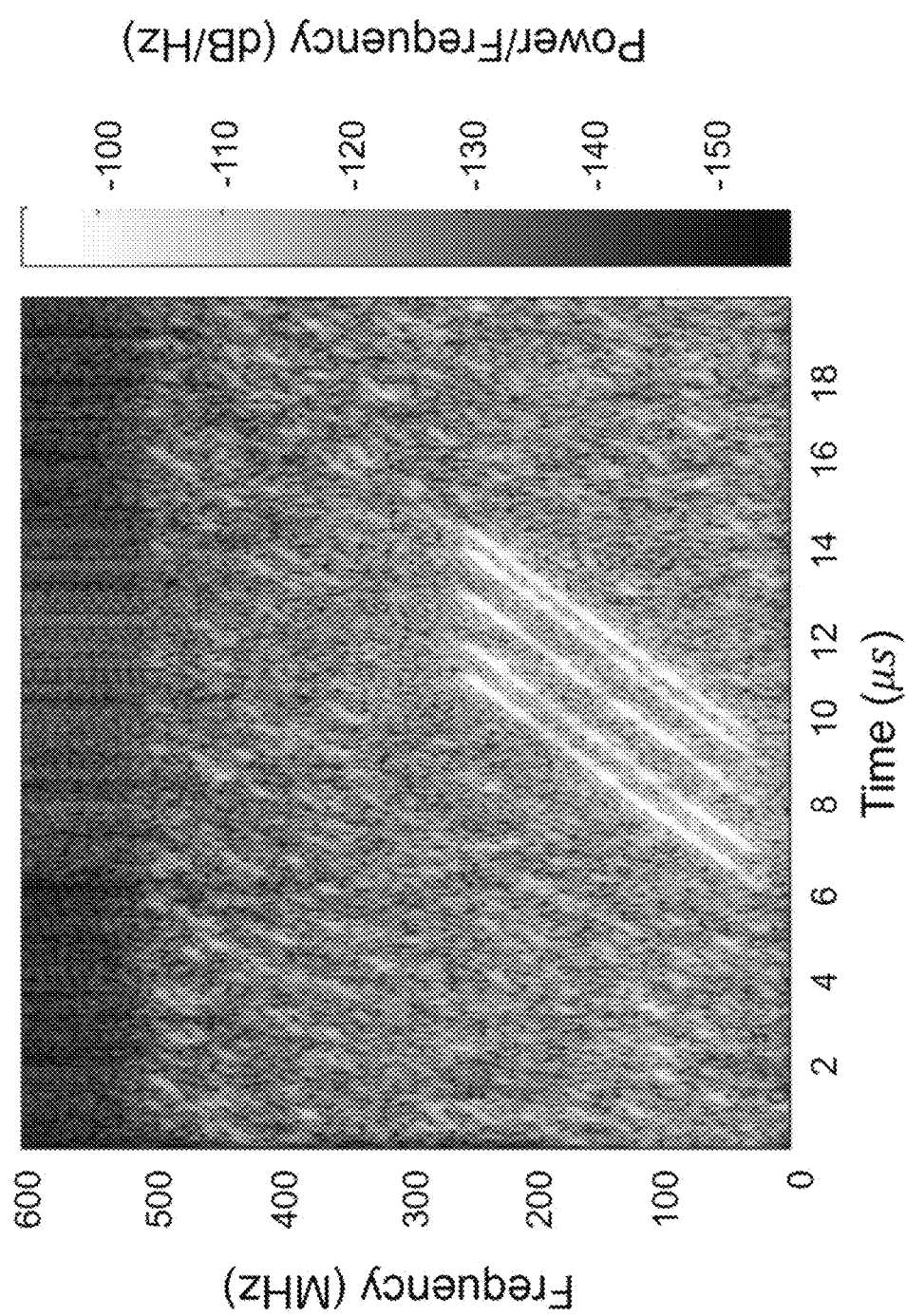
FIG. 9B is an illustration of a spectrogram of a denoised signal generated by a CSP with a time-varying reservoir according to some embodiments of the present disclosure.

For comparison, FIGS. 9A and 9B show denoising results for the CSP according to embodiments of the present disclosure, a CSP with a time-varying reservoir on the simulated scenario in FIGS. 7A-7C. The CSP has a time-varying reservoir, where the state transition matrix $A_0$ is the same as one for the static reservoir in FIGS. 8A and 8B, and $A_1 \ldots A_K$ have cyclically permuted rows to be optimized for detection of linear chirp signals. FIG. 9A shows the time domain waveforms of the original noisy input (black), de-noised output (blue), and ground truth (red), and FIG. 9B shows the spectrogram plot of the de-noised output signal. The embodiment described herein achieves an average of almost 15 dB SNR improvement across the entire 500 Mhz bandwidth, enabling the chirp signals to be detected despite the high level of noise in the signal environment.

Based on experimental studies, the system described herein can also detect weak echo signals in real high frequency (HF) band (e.g., 3-30 Mhz) data. The signal is experimental I/Q data containing noise, interferers and echoes. The source signal of interest is a signal frequency modulated continuous wave (FMCW) waveform from an over-the-horizon (OTH) radar maritime data collection platform. The goal is to precisely detect both this transmitted signal as well as its echoes in order to perform a geolocation task. The sampling frequency of the data collection platform is 200 Kilohertz (Khz), resulting in a bandwidth of 200 Khz of complex I/Q data. The source signal occupies an 8 Khz bandwidth and has a chirp rate of $2.1688*10^{-6}$ $fs^2$.

Figure 10A:
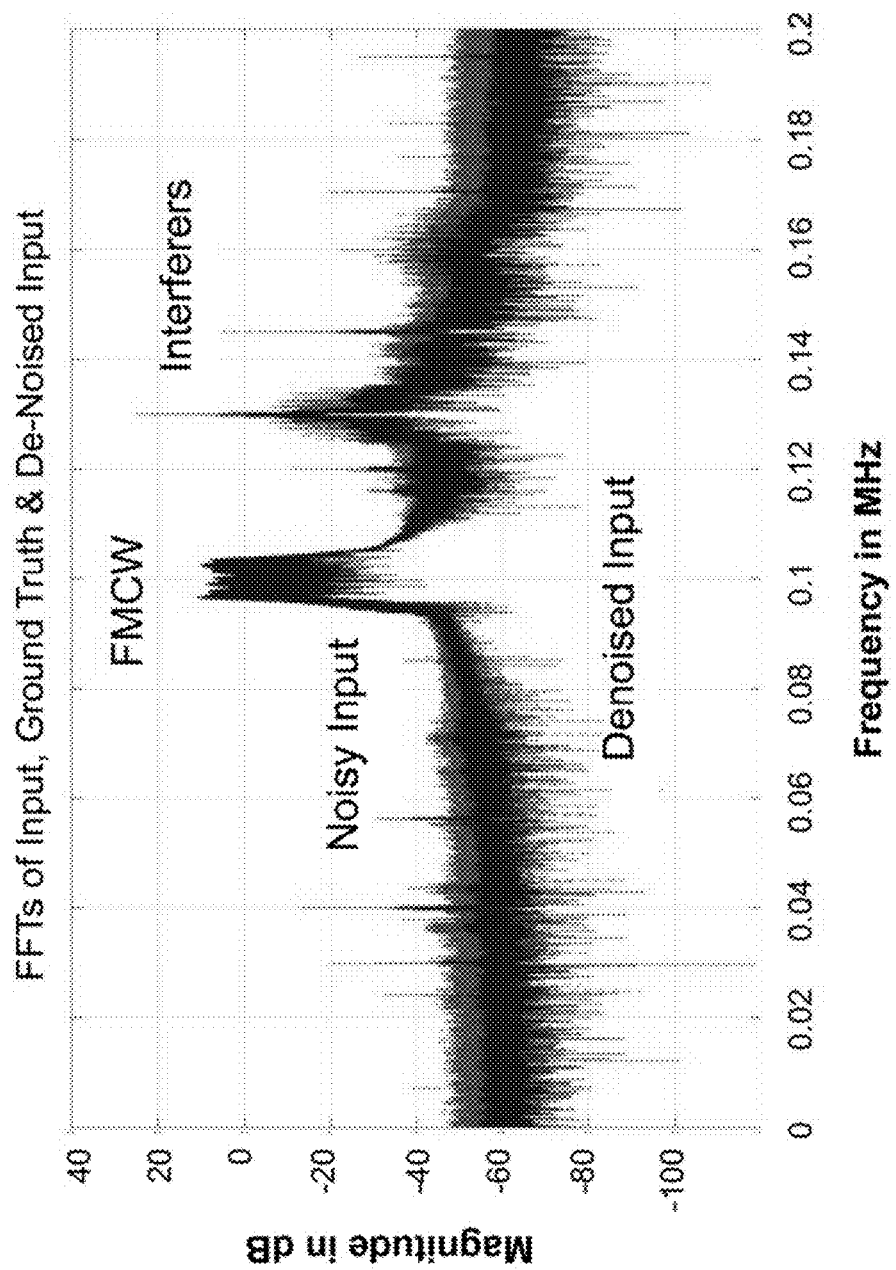
FIG. 10A is an illustration of frequency domain plots of a noisy input signal and a predictive filter response generated by a CSP with a static reservoir according to prior art.
Figure 10B:
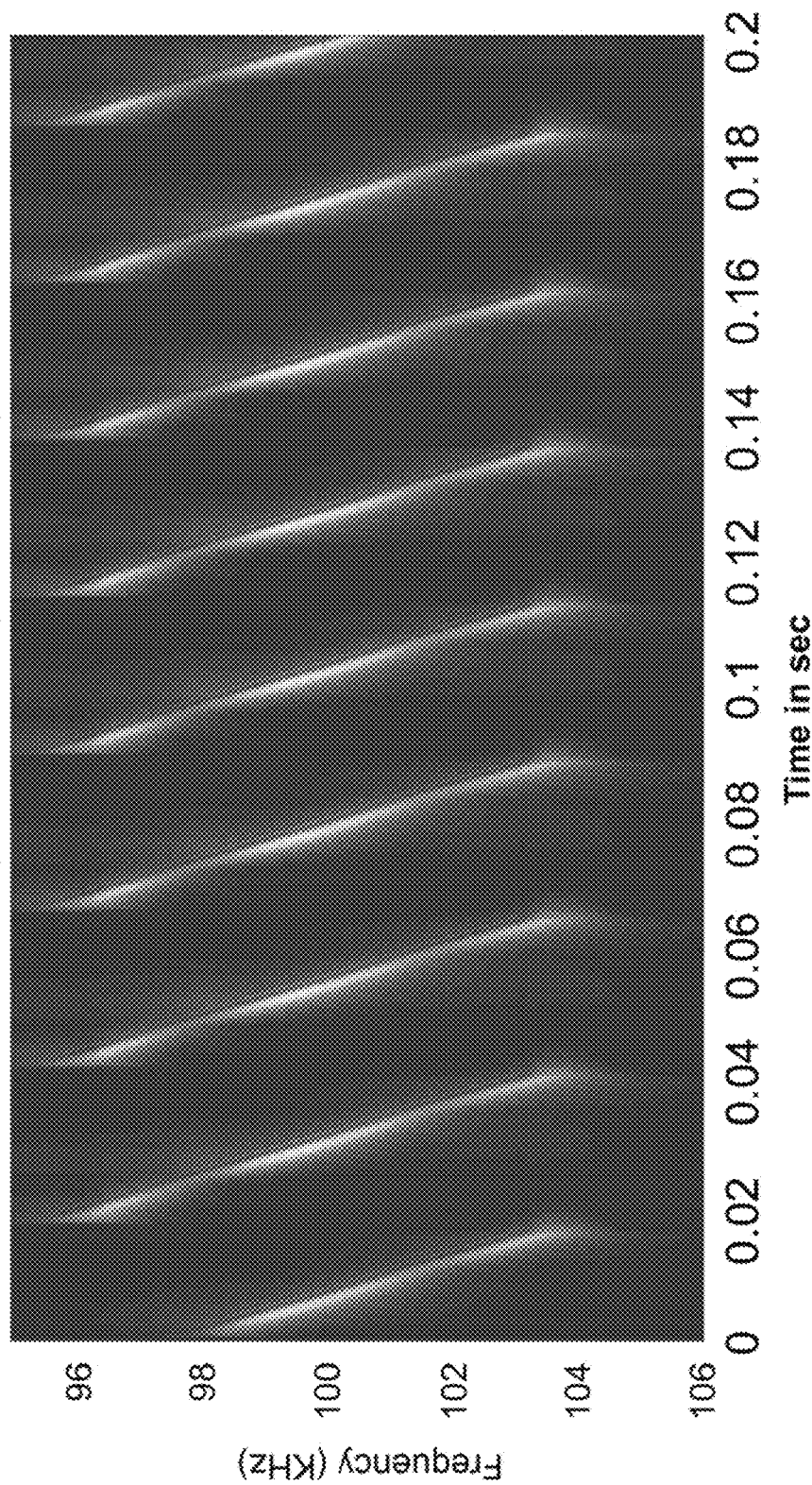
FIG. 10B is an illustration of a real-time spectrogram of a denoised signal generated by a CSP with a static reservoir according to prior art.

FIGS. 10A and 10B shows the results of applying a prior art CSP with a static reservoir to the HF data collected from the OTH radar platform. FIG. 10A shows a frequency domain plot of the noisy input signal in red and the denoised output signal in blue. FIG. 10B shows the real-time spectrogram of the denoised output signal. Using a CSP with a static reservoir, some noise is removed from the signal and, while it is possible to detect the main FMCW pulses, the weak echoes cannot be resolved.

Figure 11:
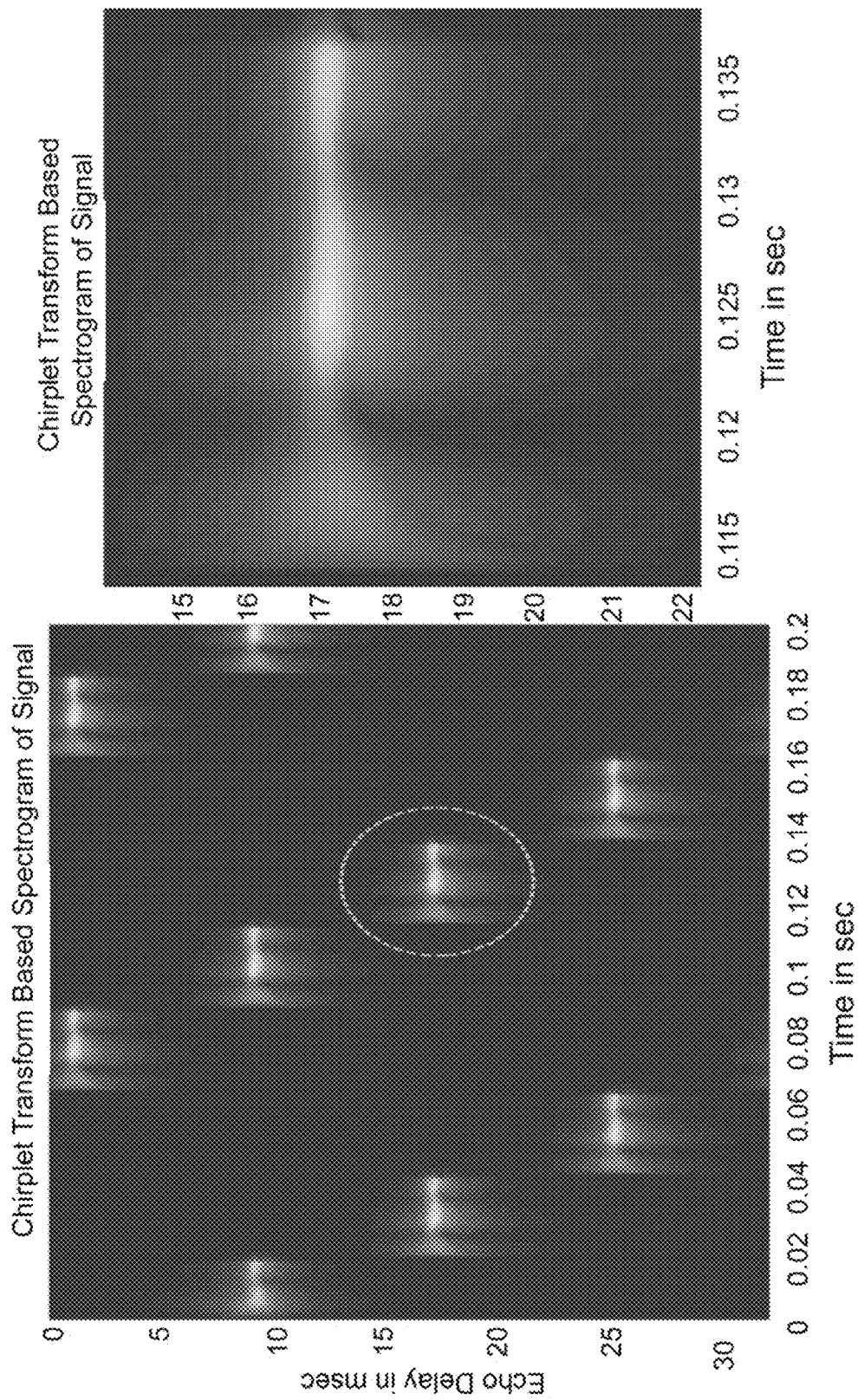
FIG. 11 is an illustration of a fine time-resolution chirplet spectrogram of frequency-modulated continuous wave (FMCW) pulses according to some embodiments of the present disclosure.
Figure 12:
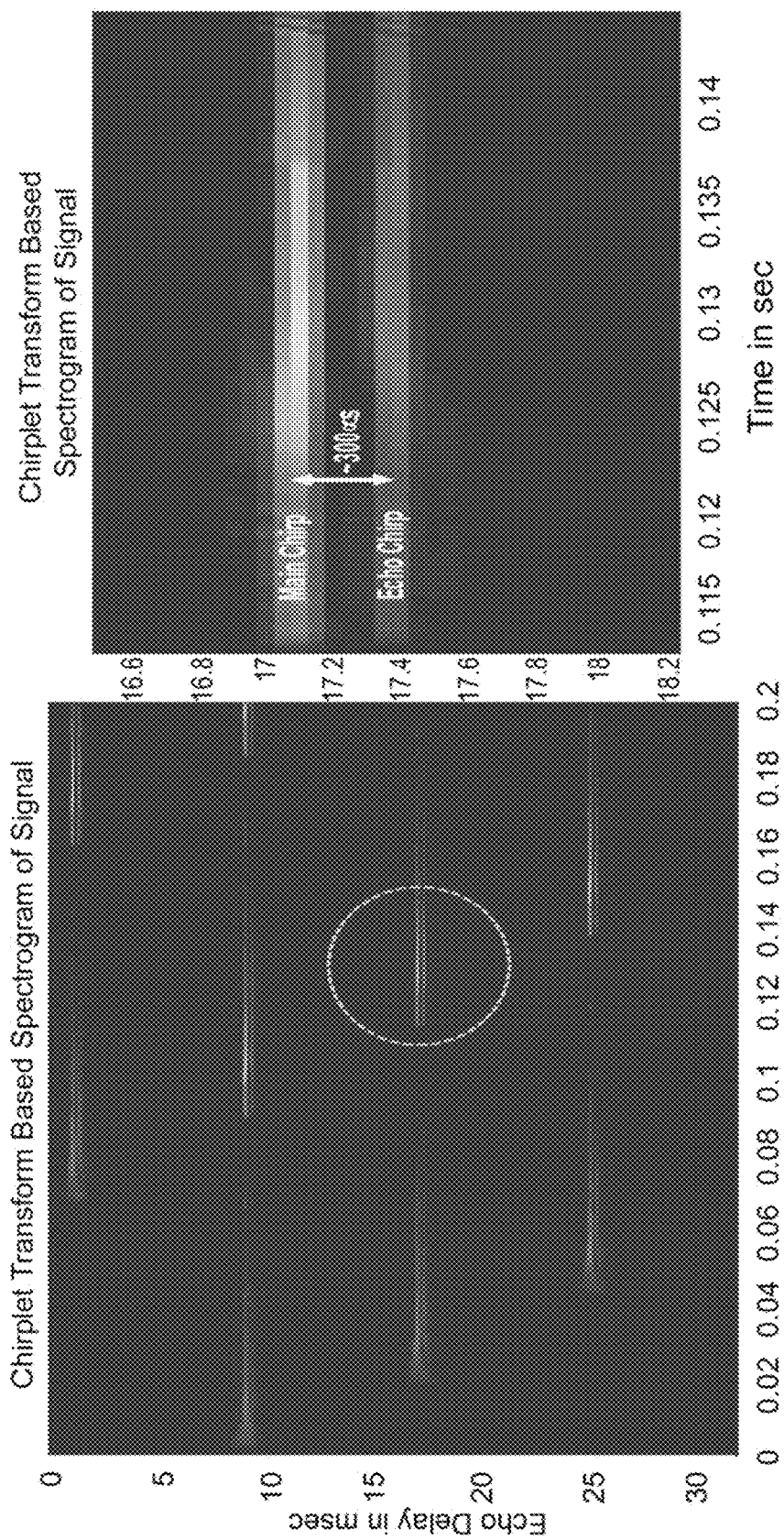
FIG. 12 is an illustration of a fine frequency-resolution chirplet spectrogram of FMCW pulses according to some embodiments of the present disclosure.

In FIGS. 11 and 12, the CSP described herein is used with a time-varying reservoir to both perform better denoising of the signal and generate real-time chirplet spectrograms. The time-varying reservoir is constructed to match the $2.1688*10^{-6}$ $fs^2$ chirp rate of the FMCW pulses, causing the FMCW pulses to appear as horizontal lines in the chirplet spectrogram. By varying the learning rate of the reservoir, tradeoffs can be made between the time resolution and frequency resolution of the chirplet spectrogram.

FIG. 11 depicts a chirplet spectrogram with fine time resolution. It is able to accurately detect the time onset of each FMCW pulse, but due to poor frequency and range resolution is not able to disambiguate any echoes from the main pulses. FIG. 12 illustrates a chirplet spectrogram with fine frequency resolution. The use of the time-varying reservoir enabled the chirplet spectrogram to reveal an echo with a ~300 μs delay, corresponding to a large reflecting object approximate 90 kilometers (km) from the radar platform.

Reservoir computers with a static transition matrix are only able to predict and de-noise signals that are roughly stationary. For example, chirp signals commonly used in radar applications have center frequencies that change rapidly with time and thus do not have stationary statistics. CSPs with static reservoirs are not able to adequate de-noise and detect chirp signals in low SNR signal environments; however, the CSP according to embodiments of the present disclosure can.

Figure 13:
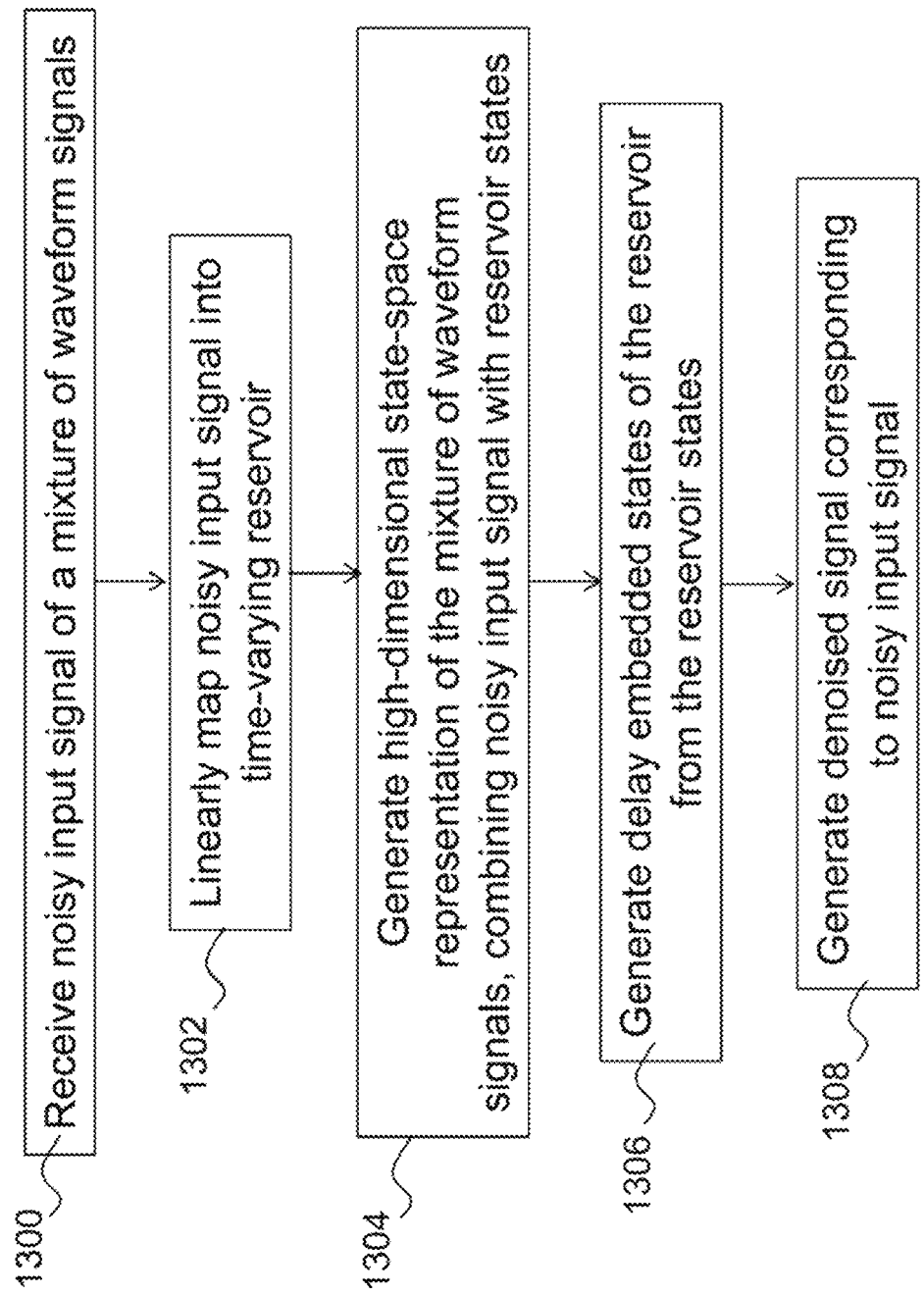
FIG. 13 is a flow diagram illustrating signal denoising according to some embodiments of the present disclosure.

FIG. 13 is a flow diagram depicting the system for signal denoising according to embodiments of the present disclosure, as described in detail above. The system receives a noising input signal of a mixture of waveform signals (element 1300). The noisy input signal is linearly mapped into the time-varying reservoir of the CSP (element 1302). A high-dimensional state-space representation of the mixture of waveform signals is generated by combining the noisy input signal with a plurality of reservoir states (element 1304). Delay embedded states of the reservoir are generated from the reservoir states (element 1306), and a denoised signal corresponding to the noisy input signal is generated (element 1308).

The embodiment described herein is directly applicable to early warning (EW) systems, particularly Electronic Support Measures (ESM) receivers, and to other systems on airborne platforms. The CSP according to embodiments of the present disclosure can be utilized by ESM systems that can perform real-time processing of signals over an ultra-wide bandwidth. The system described herein provides expanded situational awareness, providing the core functionality required for ultra-low latency signal detection and analysis over a 30 Ghz instantaneous bandwidth to enable real-time resource allocation based on the RF environment. This performance can be achieved on computing platforms with >100× reduction in size, weight, and power. The time-varying reservoir computer used by this invention enables the rapid de-noising and detection of nonstationary signals, such as chirps that are widely used in radar systems on a wide variety of unmanned autonomous vehicles (UAVs) and in automobiles with autonomous capabilities (e.g., adaptive cruise control).

The cognitive signal processor according to embodiments of the present disclosure is also applicable to vehicle applications, enabling multi-static radar and cognitive radio in low SNR conditions. It can also be used in vehicle manufacturing, helping to significantly de-noise the control signal used for automated welding in the factory. Automated welding relies on a control signal to measure the position of the welder and state of the welding process. By removing noise from the control signal, the position and state can be estimated more accurately. Further, the time-varying reservoir computer used in this invention is particularly useful to detect and track frequency-modulated continuous wave (FMCW) chirp pulses that are used in a wide variety of automotive radar systems. A radar pulse from another car at sufficiently long range will have low signal-to-noise ratio (SNR). By denoising the measured signal, an automotive radar system can detect radar pulses more accurately and at longer ranges.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for signal denoising using reservoir computing, the system comprising:
   a cognitive signal processor having a reservoir computer (RC) and a non-transitory computer-readable medium having executable instructions encoded thereon such that when executed, the cognitive signal processor performs operations of:
   receiving a nonstationary, time-varying noisy input signal comprising a time-series of data points from a mixture of waveform signals;
   using the RC, linearly mapping the noisy input signal into a time-varying reservoir, wherein the time-varying reservoir is a recurrent neural network;
   using the time-varying reservoir, generating a high-dimensional state-space representation of the mixture of waveform signals by combining the noisy input signal with a plurality of reservoir states, wherein each reservoir state corresponds to a response to a time-varying filter in a set of time-varying filters;
   applying a phase delay embedding technique to each reservoir state to obtain a history of reservoir state dynamics, resulting in a plurality of delay-embedded states,
   wherein the time-varying reservoir is obtained by applying a distinct reservoir state transition matrix for each delay-embedded state; and
   generating a denoised signal corresponding to the nonstationary, time-varying noisy input signal.

2. The system as set forth in claim 1, wherein the cognitive signal processor further performs an operation of generating a real-time denoised time-varying spectrogram of the noisy input signal.

3. The system as set forth in claim 1, wherein the cognitive signal processor further performs an operation of adapting the delay-embedded states for producing a predicted input signal a time-step into the future.

4. The system as set forth in claim 1, wherein the cognitive signal processor further performs operations of:
   determining an error function between a predicted input signal and the noisy input signal; and
   adapting output layer weights of the time-varying reservoir in an iterative process using the error function.

5. The system as set forth in claim 4, wherein the error function is used to adapt the output layer weights via a gradient learning algorithm.

6. The system as set forth in claim 1, wherein each reservoir state transition matrix comprises a block diagonal structure.

7. The system as set forth in claim 1, wherein the nonstationary, time-varying noisy input signal is a chirp signal.

8. The system as set forth in claim 1, wherein the denoised signal is used in an automotive radar system for detection of radar pulses.

9. A computer implemented method for signal denoising, the method comprising an act of:
   causing a cognitive signal processor having a reservoir computer to execute instructions encoded on a non-transitory computer-readable medium, such that upon execution, the cognitive signal processor perform operations of:
   receiving a nonstationary, time-varying noisy input signal comprising a time-series of data points from a mixture of waveform signals;
   using the RC, linearly mapping the noisy input signal into a time-varying reservoir, wherein the time-varying reservoir is a recurrent neural network;
   using the time-varying reservoir, generating a high-dimensional state-space representation of the mixture of waveform signals by combining the noisy input signal with a plurality of reservoir states, wherein each reservoir state corresponds to a response to a time-varying filter in a set of time-varying filters;
   applying a phase delay embedding technique to each reservoir state to obtain a history of reservoir state dynamics, resulting in a plurality of delay-embedded states
   wherein the time-varying reservoir is obtained by applying a distinct reservoir state transition matrix for each delay-embedded state; and
   generating a denoised signal corresponding to the nonstationary, time-varying noisy input signal.

10. The method as set forth in claim 9, wherein the cognitive signal processor further performs an operation of generating a real-time denoised time-varying spectrogram of the noisy input signal.

11. The method as set forth in claim 9, wherein the cognitive signal processor further performs an operation of adapting the delay-embedded states for producing a predicted input signal a time-step into the future.

12. The method as set forth in claim 9, wherein the cognitive signal processor further performs operations of:
   determining an error function between a predicted input signal and the noisy input signal; and
   adapting output layer weights of the time-varying reservoir in an iterative process using the error function.

13. The method as set forth in claim 12, wherein the error function is used to adapt the output layer weights via a gradient learning algorithm.

14. A computer program product for signal denoising, the computer program product comprising:
   computer-readable instructions stored on a non-transitory computer-readable medium that are executable by a computer comprising a cognitive signal processor having a reservoir computer for causing the cognitive signal processor to perform operations of:

receiving a nonstationary, time-varying noisy input signal comprising a time-series of data points from a mixture of waveform signals;

using the RC, linearly mapping the noisy input signal into a time-varying reservoir, wherein the time-varying reservoir is a recurrent neural network;

using the time-varying reservoir, generating a high-dimensional state-space representation of the mixture of waveform signals by combining the noisy input signal with a plurality of reservoir states, wherein each reservoir state corresponds to a response to a time-varying filter in a set of time-varying filters;

applying a phase delay embedding technique to each reservoir state to obtain a history of reservoir state dynamics, resulting in a plurality of delay-embedded states wherein the time-varying reservoir is obtained by applying a distinct reservoir state transition matrix for each delay-embedded state; and generating a denoised signal corresponding to the nonstationary, time-varying noisy input signal.

15. The computer program product as set forth in claim 14, further comprising instructions for causing the cognitive signal processor to further perform an operation of generating a real-time denoised time-varying spectrogram of the noisy input signal.

16. The computer program product as set forth in claim 14, further comprising instructions for causing the cognitive signal processor to perform an operation of adapting the delay-embedded states for producing a predicted input signal a time-step into the future.

17. The computer program product as set forth in claim 14, further comprising instructions for causing the cognitive signal processor to further perform operations of:
  determining an error function between a predicted input signal and the noisy input signal; and
  adapting output layer weights of the time-varying reservoir in an iterative process using the error function.

18. The computer program product as set forth in claim 17, wherein the error function is used to adapt the output layer weights via a gradient learning algorithm.

* * * * *